United States Patent
Tatchell et al.

[19]

[11] Patent Number: 5,999,611
[45] Date of Patent: Dec. 7, 1999

[54] SUBSCRIBER INTERFACE FOR ACCESSING AND OPERATING PERSONAL COMMUNICATION SERVICES

[75] Inventors: Gregory R. Tatchell, Langley; Cynthia I. Ishikawa, Vancouver; R. Blair Stacey, Burnaby, all of Canada

[73] Assignee: Stentor Resource Centre Inc., Ontario, Canada

[21] Appl. No.: 08/756,828

[22] Filed: Nov. 19, 1996

[51] Int. Cl.⁶ .................................................. H04M 1/64
[52] U.S. Cl. ...................... 379/211; 379/88.01; 379/197; 379/88.25
[58] Field of Search .................................... 379/67, 88, 89, 379/201, 210, 211, 212, 213, 88.01, 88.02, 88.25, 88.26, 196, 197

[56] References Cited

U.S. PATENT DOCUMENTS

| | | | |
|---|---|---|---|
| 5,263,084 | 11/1993 | Chaput et al. | 379/215 |
| 5,299,260 | 3/1994 | Shaio | 379/265 |
| 5,329,578 | 7/1994 | Brennan et al. | 379/67 |
| 5,357,564 | 10/1994 | Gupta et al. | 379/188 |
| 5,361,295 | 11/1994 | Solomon et al. | 379/67 |
| 5,375,161 | 12/1994 | Fuller et al. | 379/210 |
| 5,428,678 | 6/1995 | Fitzpatrick et al. | 379/201 |
| 5,430,791 | 7/1995 | Feit et al. | 379/67 |
| 5,434,908 | 7/1995 | Klein | 379/88 |
| 5,467,388 | 11/1995 | Redd et al. | 379/196 |
| 5,475,746 | 12/1995 | Miller et al. | 379/201 |
| 5,488,652 | 1/1996 | Bielby et al. | 379/88 |
| 5,511,111 | 4/1996 | Serbetcioglu et al. | 379/67 |

FOREIGN PATENT DOCUMENTS

WO 94/29992  12/1994  WIPO .............................. H04M 3/38

OTHER PUBLICATIONS

"User Manual" Wildfire Communications Inc.

*Primary Examiner*—Fan S. Tsang
*Attorney, Agent, or Firm*—Cobrin & Gittes

[57] ABSTRACT

A subscriber interface operating as a Personal Agent is provided to simplify, enhance and integrate the currently fragmented telephone services. The Personal Agent enables the subscriber to access and activate telephone network services using voice recognition technology. The subscriber interface is seamlessly integrated with the telephone network to enable the subscriber to perform one or more activation and deactivation commands of telephone features, initiate a call, and take calls at their discretion. The subscriber interface also enables the subscriber to administer the options that tailor the system to the subscriber. Access and activation of telephone features are enabled by the subscriber using voice commands. In particular, the present invention integrates Calling Line ID (CLID) with the names identified in a voice dialing personal directory and/or Name Display database to enable the user to use spoken names to instruct the various telephone features to work specifically on particular lines, e.g. "Call Forward all calls to voice mail except for "Mom". The voice dialing directory (or Name Display database) can then be used to identify "mom"'s phone number(s) which would be matched against the incoming CLIDs to determine how to route incoming calls.

72 Claims, 18 Drawing Sheets

Audio Response Module Database

| Command Code | Audio Response |
|---|---|
| 0010111 | 'Message deleted' |
| 1001101 | 'New greeting' |
| 0111001 | 'Current greeting' |
| 0001111 | 'No new messages' |
| 0001101 | 'One message from' |
| 110000 | ----- |

FIG. 4b

Word Database

| Words | Signal | Command Code |
|---|---|---|
| Delete | ⌇⌇ | 001011 |
| Compose | ⌇⌇ | 1100110 |
| Change greeting | ⌇⌇ | 1011100 |
| Play | ⌇⌇ | 1000111 |
| Message | ⌇⌇ | 1000110 |
| Stored | ⌇⌇ | 1110000 |
| New | ----- | ----- |

FIG. 4a

C. Jones
Contact Database

| Name | Location | CLID | Spoken Name | Cat. # 1 | Cat. # 2 | CW Priority |
|---|---|---|---|---|---|---|
| Mother | Home | 416-440-5679 | ∿∿ | Personal | Family | Always |
| Bob Smith | Cellular<br>Work<br>Home | 416-802-7463<br>416-550-1111<br>416-976-9999 | ∿∿ | Business | Project Team | 9-5 only |
| Dr. Pearce | Office | 416-444-1962 | ∿∿ | Personal | | Always |

FIG. 5b

SUBSCRIBER INTERFACE FOR ACCESSING AND OPERATING PERSONAL COMMUNICATION SERVICES

FIELD OF THE INVENTION

This invention relates to personal communication services (PCS) agents, more commonly called Personal Agents, but more particularly, to an improved subscriber interface which facilitates the subscriber's access and operation of personal communication services using voice activated commands.

BACKGROUND OF THE INVENTION

Telephone service subscribers have, in the last five to ten years, been offered a plethora of new communication services which have in theory been provided to facilitate the subscriber's use of the telephone network. Some of these new services may be subscribed from a telephone service provider on a monthly or on a per-call basis, depending on the type of service.

Although most of these will be known to persons skilled in the art of telephony, these new services are briefly reviewed for convenience and to illustrate to some extent what some people call telephone service overload.

These include:

i) Calling Number/Name Identification which lets the subscriber see using an appropriate display, the name and/or the number of the caller before the call is answered;

ii) Call Answer Service which automatically answers the subscriber's calls if the subscriber is unavailable or on the phone. This service provides callers with a personal greeting recorded by the subscriber and enables incoming callers to leave a message;

iii) Extension Call Answer Service which provides personal answering for up to four people. Callers are given a personal greeting and offered a selection of the person they want to leave a message for;

iv) Residential Voice Mail service is a service which gives the subscriber ability to send messages to other Call Answer subscribers without ringing their telephone set or talking to them directly.

v) Call Waiting Service which lets the subscriber know if another call from a third party is waiting while the subscriber is on line with another party.

vi) Spontaneous Caller Identification with Call Waiting is an enhancement to call waiting service which enables subscribers with a special display telephone to see the calling number/name identification of an incoming third party call while being on line.

vii) Distinctive Ringing provides the subscriber with a number of distinguishing rings to allow the subscriber to identify the number being called.

viii) Basic Call Screening is a service offered to telephone subscribers wherein up to twelve numbers of the subscriber's choice are directed to a recording that tells the caller that the subscriber is not available. With this service, the telephone will not ring if any one of those twelve callers dials the subscriber's telephone number. The subscriber can add or delete numbers at any time.

ix) Three-Way Calling Service enables the subscriber to talk with two other people at different locations at the same time.

x) Call Return Service provides the subscriber with the telephone number of the last person who called whether the call was answered or not.

xi) Call Again or Busy Call Return is a derivation of Call Return wherein the service monitors a busy line for a predetermined amount of time without the subscriber having to redial the number continuously until the connection is made.

xii) Call Forwarding Service enables the subscriber to transfer calls from one telephone to another.

xiii) Speed Calling Service enables subscribers to make use of abbreviated dialing for a certain number of telephone numbers.

As can be seen from the above, telephone service subscribers can be offered several different telephone features; in fact, several more are being developed. Most features require the subscriber to use one or more codes in association with the (*) and/or (#) keys to activate and de-activate the feature.

The problem associated with the offering of these services is that the subscriber is required to remember and make use of predetermined activation codes to operate and access each service. Thus, even though these services are provided to assist the subscriber in controlling incoming and outgoing calls, it has made the use of all of these services that much more difficult to operate by the subscriber.

Obviously, the vast majority of subscribers will not remember which code to use and therefore have to make use of one or more reminder cards showing activation and de-activation codes. If a card is lost, the subscriber has to contact the service provider for advice in using the service or feature.

This is not only annoying and cumbersome to most users, but also can cause the subscriber to cancel the service after just a few months of use.

In addition, because of these shortcomings, the majority of these services are rarely used to their full potential.

Recently, developments have been made to facilitate the use of one or more of these telephone network services. However, these efforts are being directed towards call screening and prioritization of incoming calls as opposed to integrating and assisting the subscriber with the use of all of these telephone services.

For example, PCT Publication No. WO91/07838 published May 30, 1991 describes a method and apparatus for providing call screening and forwarding for calls directed to a subscriber.

U.S. Pat. No. 5,329,578 which issued to Brennan describes a personal communication service with mobility manager which enables a subscriber to tailor the telephone service to provide communication mobility and incoming call management. Calls to a personal number assigned to the subscriber are routed to a PCS service node which will reroute the call according to the subscriber's service profile stored in a database. The service node ensures that attempts to communicate with the subscriber are handled with appropriate consideration for who is calling, when the call is made, and the urgency of the call. The subscriber is given control over how the system will work for them in routing incoming calls.

Although the aforementioned prior art inventions have helped the subscriber in using call screening and prioritization services, they are still quite limited and problematic for the subscriber. For example, one of the problems associated with the PCS system described in each of the aforementioned prior art documents, is that they operate as an adjunct to the subscriber's telephone service. What this means, is that the subscriber is required to dial a pre-determined number to access the subscriber's profile. In addition, any changes to the mobility and incoming call management profile of the subscriber can only be done using lengthy and complicated interactive voice response (IVR) interfaces. Also, since the PCS service requires the use of a unique telephone number in order to make use of the screening and call routing capabilities of the system, the control of incoming calls can only be made if callers dial this unique telephone number. That is, callers having access to the subscriber's home, business, cellular or other telephone number, can still call the subscriber directly, therefore bypassing the PCS service.

In addition, these prior art inventions do not offer any improvement in managing telephone features such as the Voice Messaging System, Call Waiting, Call Display, Call Return, etc.

A need therefore exists for an improved subscriber interface which overcomes the problems associated with the aforementioned prior art systems.

SUMMARY OF THE INVENTION

In accordance with the system and method of the present invention, a subscriber interface operating as a Personal Agent is provided to simplify, enhance and integrate the currently fragmented telephone services. The Personal Agent enables the subscriber to access and activate telephone network services using voice recognition technology. The subscriber interface is seamlessly integrated with the telephone network to enable the subscriber to perform one or more activation and deactivation commands of telephone features, initiate a call, and take calls at their discretion. The subscriber interface also enables the subscriber to administer the options that tailor the system to the subscriber. Access and activation of telephone features are enabled and disabled by the subscriber using voice commands. In particular, the present invention integrates Calling Line ID (CLID) with the names identified in a personal directory and/or Name Display database to enable the subscriber to use spoken names to instruct the various telephone features to work specifically on particular lines, e.g. "Call Forward all calls to voice mail except for "Mom". The voice dialing directory (or Name Display database) can then be used to identify "mom"'s phone number(s) which would be matched against the incoming CLIDs to determine how to route incoming calls.

In accordance with one feature of the present invention, the subscriber interface forms an integral part of the subscriber's telephone service to eliminate the need of the subscriber to dial a predetermined number to access his or her personal communication services, that is the subscriber is given implicit access to the Personal Agent, by going off hook from any one of a number of predetermined subscriber locations from which the subscriber may be calling.

In accordance with another feature of the present invention, the Personal Agent eliminates the opportunity of a caller to by-pass the subscriber's Personal Agent.

In accordance with another feature of the present invention, the subscriber can automatically control the Personal Agent using voice activated commands which are followed by voice responses from the Personal Agent.

In accordance with another feature of the present invention, the Personal Agent service can be accessed from one or more locations.

In accordance with another feature of the present invention, security access to the Personal Agent is controlled by means of a subscriber voice print and/or DTMF code to prevent unauthorized access and use of the Personal Agent.

In accordance with another feature of the present invention, incoming call management is provided for a subscriber using the Personal Agent to intercept calls directed to any one of the subscriber's network addresses identified in the subscriber call management profile.

In accordance with another feature of the present invention, incoming call management is provided by the Personal Agent by making use of a contact database having the telephone numbers and prerecorded names of the subscriber's commonly-known contacts such that incoming call screening based on calling line identification can provide the subscriber with the prerecorded name of the calling party.

In accordance with another feature of the present invention, incoming call management can be provided by the Personal Agent by making use of CCS7 messages for calls not provided in the subscriber's contact database.

In accordance with another feature of the present invention, the Personal Agent provides the subscriber with the opportunity to add a new name and directory number(s) to the subscriber's personal directory.

In accordance with another feature of the present invention, the subscriber's location for the purpose of routing incoming calls can be dynamically tailored according to the location from where the subscriber is contacting the Personal Agent.

In accordance with another feature of the invention, the Personal Agent enables the subscriber to effect selective call forwarding according to a predetermined list of CLIDs which can dynamically be modified by the subscriber.

In accordance with another feature of the invention, incoming call management is provided by the Personal Agent by enabling incoming calls to be screened based on whether the incoming call is long distance, data, or other types of calls requiring special routing treatment.

In accordance with another feature of the invention, the Personal Agent provides subscriber access to and control of call waiting options.

In accordance with another feature of the invention, the Personal Agent can further screen incoming call waiting calls based on the priority level of the subscriber's existing call, status, and whether the incoming call is a data, long distance or other types of calls.

In accordance with another feature of the present invention, the Personal Agent provides special call waiting announcements to callers based on various screening parameters.

In accordance with yet another feature of the invention, the Personal Agent provides caller controlled options for call waiting calls.

In accordance with yet another embodiment of the invention, a voice messaging subscriber interface is provided by the Personal Agent for accessing and operating the voice messaging system using voice-activated commands.

In accordance with yet another feature of the present invention, the Personal Agent voice messaging interface enables a subscriber to request a list of new messages, play messages in any order, and play voice mail greetings according to calling party's identification.

In accordance with yet another feature of the present invention, the Personal Agent voice messaging interface enables a subscriber to receive a message waiting indication at any one of the subscriber's predetermined network addresses.

In accordance with yet another feature of the invention, the Personal Agent interface enables a subscriber to initiate outgoing calls via the Personal Agent using voice activated dialing, even while accessing voice mail.

In accordance with yet another feature of the present invention, voice activated dialing of outgoing calls can either be made by the subscriber using speech recognition of dialed digits or using the subscriber's contact database of existing recorded names and places for initiating outgoing calls or dialing digits as is currently done.

In accordance with yet another feature of the present invention, the Personal Agent provides the subscriber with incoming and outgoing call logs.

In accordance with yet another feature of the present invention, the Personal Agent provides the subscriber with reminders of the subscriber settings and reminder messages entered by the subscriber.

In accordance with yet another feature of the present invention, the Personal Agent can integrate voice mail distribution features with the subscriber contact database.

BRIEF DESCRIPTION OF THE DRAWINGS

The invention will be better understood by an examination of the following description, together with the accompanying drawings, in which:

FIG. 4a is a table illustrating a typical word database for use with the speech recognition module according to an embodiment of the present invention;

FIG. 4b is a table illustrating a typical audio response module database according to an embodiment of the present invention;

FIG. 5b is a table illustrating the database content of a typical contact database;

DESCRIPTION OF THE PREFERRED EMBODIMENTS

In order to lighten the following description, the following acronyms will be used:
AIN: Advanced Intelligent Network;
BRI: Basic Rate Interface;
CCS7: SS7 Network Signalling;
CLID: Calling Line Identification;
CS&P: Call Screening & Prioritization;
CW: Call Waiting;
DN: Directory Number;
DTMF: Dual Tone Multi Frequency;
IN: Intelligent Network;
ISDN: Integrated Services Digital Network;
ISUP: ISDN User Part;
IVR: Interactive Voice Response;
POTS: Plain Ordinary Telephone System;
PRI: Primary Rate Interface;
PSTN: Public Switching Telephone Network;
SCP: Signalling Control Point;
SCWID: Spontaneous Call Waiting Identification;
SP: Signalling Points;
SSP: Service Switching Point;
STP: Signalling Transfer Point;
TCAP: Transaction Capabilities Application Part.

AIN is considered a subset of IN. However, for the purpose of the present invention, IN will be used hereinafter, even though the solutions offered here are applicable to AIN as well.

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling points (SP), service switching points (SSP), service control points (SCP) and signal transfer points (STP).

Signalling points (SP) are capable of sending and receiving SS7 messages with other SS7 -equipped telephone offices, and routing calls based on the information exchanged. Incoming messages are formatted and transferred to the relevant processing function in the switch. Outgoing messages are transmitted over the signalling links.

Service switching points (SSPs) are Signalling Points (SP) further equipped to halt call progress, launch an SS7 query to obtain additional routing information from an SCP, and then route or treat the call based on the information received in the SCP's response. SSPs interact with databases to provide services and routing.

Service control points (SCP) are often referred to as SS7 services databases. One or more SCPs can serve as a central intelligence point in the network for enhancing how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other SS7 nodes, the STP does not generally act as a source or sink for SS7 messages.

Figure 1:
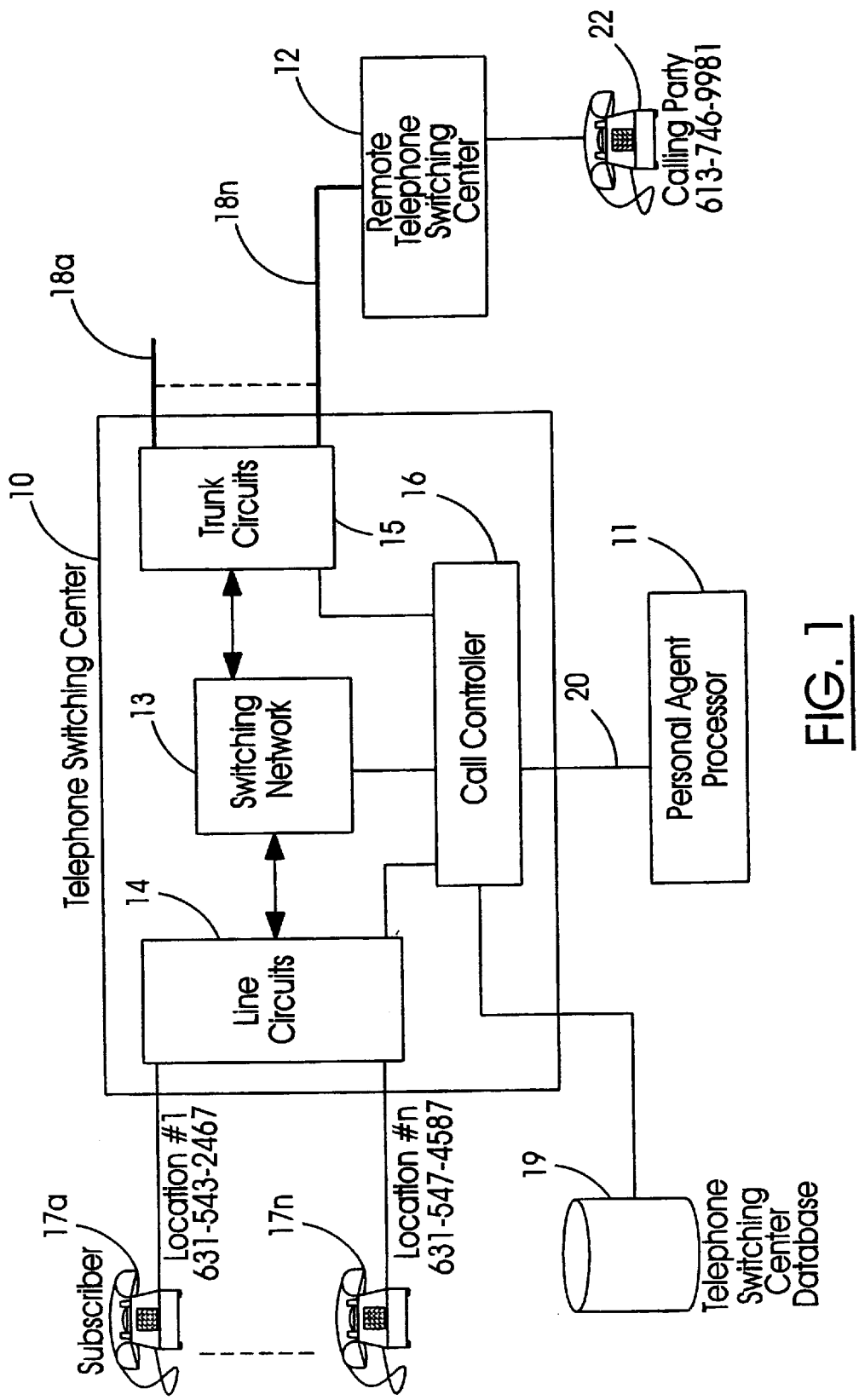
FIG. 1 is a block diagram of a telephone switching center with the Personal Agent subscriber interface of the present invention.

Referring now to FIG. 1, we have shown a block diagram of a telephone switching center 10, which may take the form of an Signalling Point (SP) in the CCS7 network. The telephone switching center is provided with a Personal Agent processor 11 adapted to provide a subscriber with enhanced and integrated communication mobility and call management services. The Personal Agent when used as the subscriber interface forms an integral part of the subscriber's telephone network in that it can be accessed seamlessly by the subscriber from any one of a predetermined number of locations, such as home, business, mobile telephone, etc. If the subscriber is located at a location where the station address is not known to the subscriber's Personal Agent, a predetermined access telephone number (such as a toll free number) would be provided to enable the subscriber to call the Personal Agent from anywhere.

The Personal Agent processor 11 enables subscribers to manage outgoing and incoming calls, and interact with their voice messaging platform using user friendly commands. These commands can either be activated using speech recognition or DTMF access codes when required.

Preferably, the Personal Agent processor 11 is located at one or more telephone switching centers to enable a Personal Agent interface to be provided to any telephone service subscriber on the network. In some instances, the Personal Agent processor 11 will be co-located with the telephone switching center 10. On the other hand, the Personal Agent processor 11 can also form part of a remote telephone switching center 12 and still provide Personal Agent interface to remotely-located subscribers. The telephone switching center 10 includes a switching network 13, line circuits 14 and trunk circuits 15, which are operative under control of a call controller 16, to provide communication paths between telephone stations 17a–17n and various trunks 18a–18n. Telephone switching centers of this general form and function are well known to persons of typical skill in the art of digital switch telephony. However, for convenience, the operation of the telephone switching center is briefly reviewed.

In its operation, the telephone switching center 10 utilizes various service circuits, not shown, for generating and detecting telephony signalling and supervision signals and interfacing signalling and supervision information with call controller 16. During typical operations, one of the functions in the progress of a telephone call is that of receiving signalling, representative of dialed or pressed digits, from a calling party at say telephone set 17a to 17n. When the dialed or pressed digits are representative of a telephone number of a called party, they are referred to as primary signalling. During the initial portion of a telephone call, dial tone is supplied to the calling party and indicates that the telephone switching center 10 has connected a service circuit, referred to as a receiver, to detect and receive primary signalling. After the telephone switching center 10 is satisfied that the primary signalling has been received, the service circuit is disconnected, and it is then available for another telephone call.

Dialed or pressed digits which may be originated at a telephone station set sometime later, during a conversational portion of the call progress, are usually referred to as secondary signalling. Secondary signalling is relied upon to provide telephone users with access to and control of telephony features such as voice messaging. As a matter of convenience, secondary signalling is usually transmitted in the form of Dual Tone Multi Frequencies (DTMF) signals. DTMF signals are transmittable by way of voice band communication paths and hence may be responded to by any telephone facility involved with the telephone call, without participation of the telephone facility directly associated with the calling party. If use is made of secondary signalling, provision is made for continuous monitoring of the conversational portion of the call progress to receive and detect any occurrence of secondary signalling. In some instances, secondary signalling is not provided for unless the telephone user takes some action, such as flashing the switch hook, or unless the telephone call has been routed to, or intercepted by, a special facility, for example, Personal Agent processor 11 shown in FIG. 1.

In the preferred embodiment of the present invention, illustrated in FIG. 1, a Personal Agent subscriber having access to the telephone network from a predetermined number of telephone stations 17a to 17n has instantaneous access to the Personal Agent processor 11 from any one of a predetermined number of locations, number 1 to number n. With the Personal Agent interface of the present invention, a subscriber located at location number 1 and making use of telephone set 17a will immediately have access to the Personal Agent processor 11 upon going off hook. Whether a line circuit is associated with a subscriber of the Personal Agent service is determined from a telephone switching center database 19. Each of the line circuits 14 has an associated network address and telephone station. The service provider maintains in database 19 a profile of each subscriber. This profile provides the telephone switching center with information regarding calling line identification, line circuit codes, class of services provided to the subscriber, etc.

With the Personal Agent service of the present invention, the telephone switching center database 19 is data filled to contain an additional subscriber parameter indicative of whether the line circuit requesting service is associated with a subscriber of the Personal Agent interface. Accordingly, when a Personal Agent subscriber goes off hook at telephone station set 17a, a verification of the subscriber profile is made from telephone switching center database 19 to determine whether that telephone set belongs to a subscriber of the Personal Agent interface.

This database is commonly called a service profile database. If the telephone station set 17a is associated with a network address provisioned for a Personal Agent subscriber, call controller 16 will couple the associated line circuit with the Personal Agent processor 11 via link 20. Link 20 may be an ISDN or PRI connection. Call controller 16 routes subscriber identity information to the Personal Agent processor 11 for the purpose of identifying to the Personal Agent the subscriber profile. This identity information may contain the CLID of the calling station, subscriber name, etc. If the telephone set that is off-hook is not associated with a Personal Agent subscriber, the calling party immediately receives dial tone. If the telephone set is associated with a Personal Agent subscriber, the Personal Agent processor then becomes the subscriber's interface to the telephone network. As will be described in further detail below, at this point, using voice commands, the subscriber can perform a number of functions, including the activation, de-activation of telephone features, initiation of a call via the Personal Agent, until the subscriber goes on-hook and the Personal Agent is released. If the telephone set is associated with the Personal Agent service and if it may be used by persons other than the subscriber, a user authentication request may be made at this point.

In another embodiment, the determination of whether the subscriber has access to a Personal Agent service is made by launching a query to a Signalling Control Point (SCP). The query would be launched as a TCAP message via a Signalling Transfer Point (STP) from the office at which the call is originating to an SSP having access to the SCP. A response from the SCP would then indicate whether the call is to be handled by the Personal Agent processor 11 or whether the serving office is to provide a dial tone to the subscriber. Similarly, the subscriber service profile may be provided from an SCP database. It should be noted that a Personal Agent subscriber may also receive a dial tone so that the operation of the telephone will not appear to be different to other users of the phone. If DTMF tones are received, the call will be processed as a normal(basic) call, rather than an agent call.

Figure 2A:
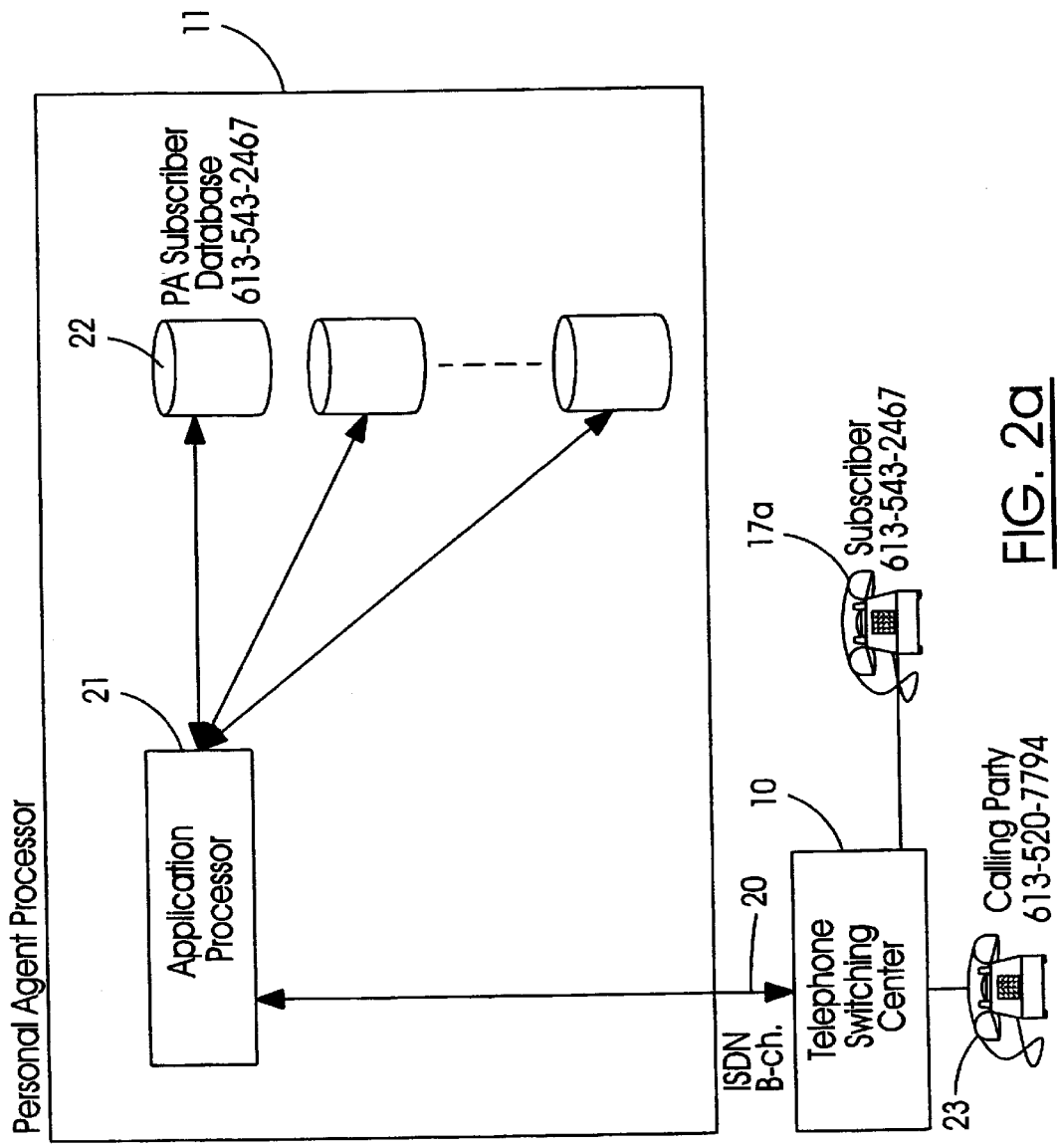
FIG. 2a is a block diagram illustrating the interaction between the telephone switching center and the Personal Agent processor of the present invention.

Referring now to FIG. 2a, we have shown generally a block diagram of the Personal Agent processor 11 connected via link 20 to telephone switching center 10. As indicated earlier, when the subscriber making use of telephone set 17a is identified as a Personal Agent subscriber by telephone switching center 10 and database 19, a path is established along link 20 to the Personal Agent processor 11. When application processor 21 receives the subscriber identity information from the telephone switching center 10, the subscriber profile is accessed from one of the Personal Agent subscriber databases 22. This way, the Personal Agent processor is provided with the operational parameters established by the individual subscriber to determine how to properly respond to incoming or outgoing calls to and from the subscriber.

As will be described further below, the subscriber database contains, among other things, the subscriber's voice print, telephone numbers, greetings, authorization codes, etc. unique to this subscriber. In addition to the above, the Personal Agent subscriber database will also contain a contact database containing a list of the subscriber's contact names, telephone numbers, categories, and call screening information.

By making use of the subscriber's profile, the Personal Agent can intercept incoming calls to any one of the subscriber's predetermined telephone network addresses. Thus, if the subscriber has selected telephone sets at locations number 1 to number n (FIG. 1) to form part of his or her profile, any time the associated number is dialed by calling party 22 shown in FIG. 1 via remote telephone switching center 12 or calling party 23 (FIG. 2a) also serviced by telephone switching center 10, the Personal Agent will intercept the call. When the number dialed by calling party 22 or 23 is routed and received at telephone switching center 10, a verification of the called number is made by the telephone switching center database 19 by call controller 16 before establishing a link between trunk circuits 15 and line circuits 14 of the called subscriber. If the incoming call is directed to any one of the Personal Agent subscriber's selected telephone network addresses, the call controller 16 establishes a call path from trunk circuits 15 to Personal Agent processor 11 to enable the Personal Agent processor to determine from the subscriber database how the call should be treated. The only time the call controller 16 can establish a connection from a trunk to a Personal Agent subscriber's line card is if the call originates or is intercepted by the Personal Agent processor. The call controller 16 would recognize the Personal Agent's identity and enable the call to go through to the subscriber's selected station. This way, a caller wanting to reach the subscriber cannot by-pass the agent. The subscriber can also permit the Personal Agent to intercept incoming calls by selecting, say, the home telephone number as the main Personal Agent access number and directing all callers to use that number. Any calls directed to the home telephone number would then be intercepted by the Personal Agent. The subscriber can also tailor his or her Personal Agent profile so that the agent intercepts call directed to only one network address.

Figure 2B:
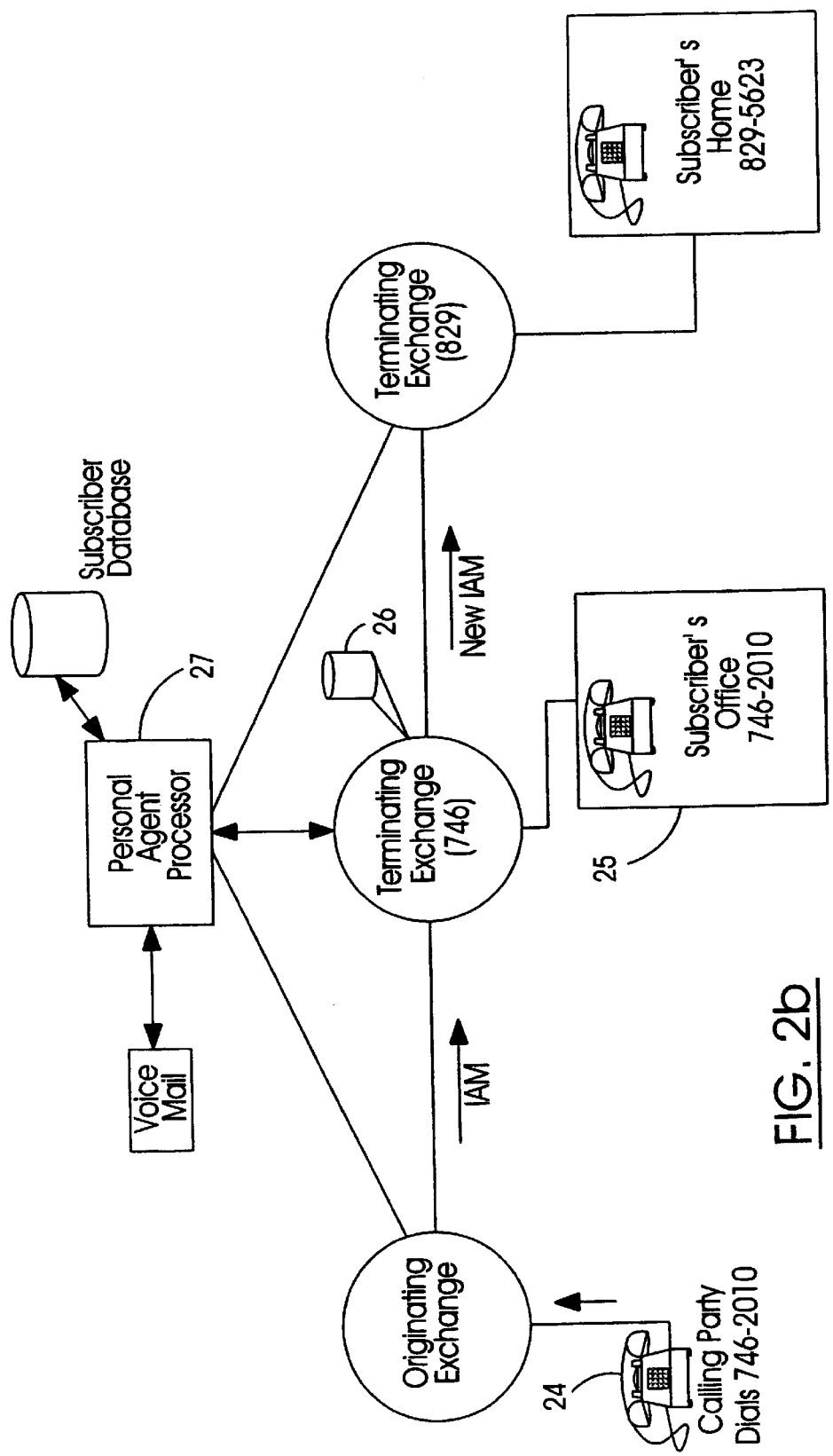
FIG. 2b is a block diagram of a call scenario wherein an incoming call is intercepted by the Personal Agent of the present invention

Referring now to FIG. 2b, we have shown a call scenario wherein a call to a subscriber is intercepted by the Personal Agent. In the scenario of FIG. 2b, a calling party 24 is trying to reach the subscriber at the office location 25 by dialing the subscriber's office DN 746-2010. The subscriber has modified the profile to intercept all calls to his office DN and route calls from predetermined calling parties directly to the subscriber's home telephone number, i.e. DN 829-5623. An incoming call would be routed as follows:

1. The 746-2010 digits are sent to the originating exchange serving caller 24.

2. An Initial Address Message (IAM) is formulated and then routed to the (746) exchange serving the subscriber's office 25.

3. The (746) exchange checks a data filled table 26 to determine if the received digits are associated with a Personal Agent subscriber.

4. If yes, the (746) exchange launches a query to the Personal Agent processor 27 to determine how to route the call. The query would contain the identity of the subscriber based on the called number DN.

5. The Call is received at the Personal Agent Processor (eg. SCP platform) and the Personal Agent verifies the subscriber profile on how to treat this particular incoming call.

6. A new routing option (829-5623) is retrieved from the subscriber profile based on information established by the subscriber.

7. A response from Personal Agent processor 27 is returned to the (746) Terminating Exchange.

8. A new IAM is then formulated at the (746) exchange and sent to an alternate terminating office, i.e. (829) exchange.

9. The terminating exchange then rings subscriber home number. It should be noted that in this example, the subscriber has requested the agent to pass the call through. If the subscriber is on a call, a number of other actions may be taken by the subscriber to handle the call, such as route the call to voice mail or provide a call waiting treatment.

In this example, a new IAM is formulated at the (746) exchange. A new IAM could of course be formulated at the originating exchange from information received in response to the query to the Personal Agent.

As will be explained further below, various options are available to a Personal Agent subscriber in the screening, routing or forwarding of incoming calls based on the subscriber profile and calling line ID of the calling party.

Figure 3:
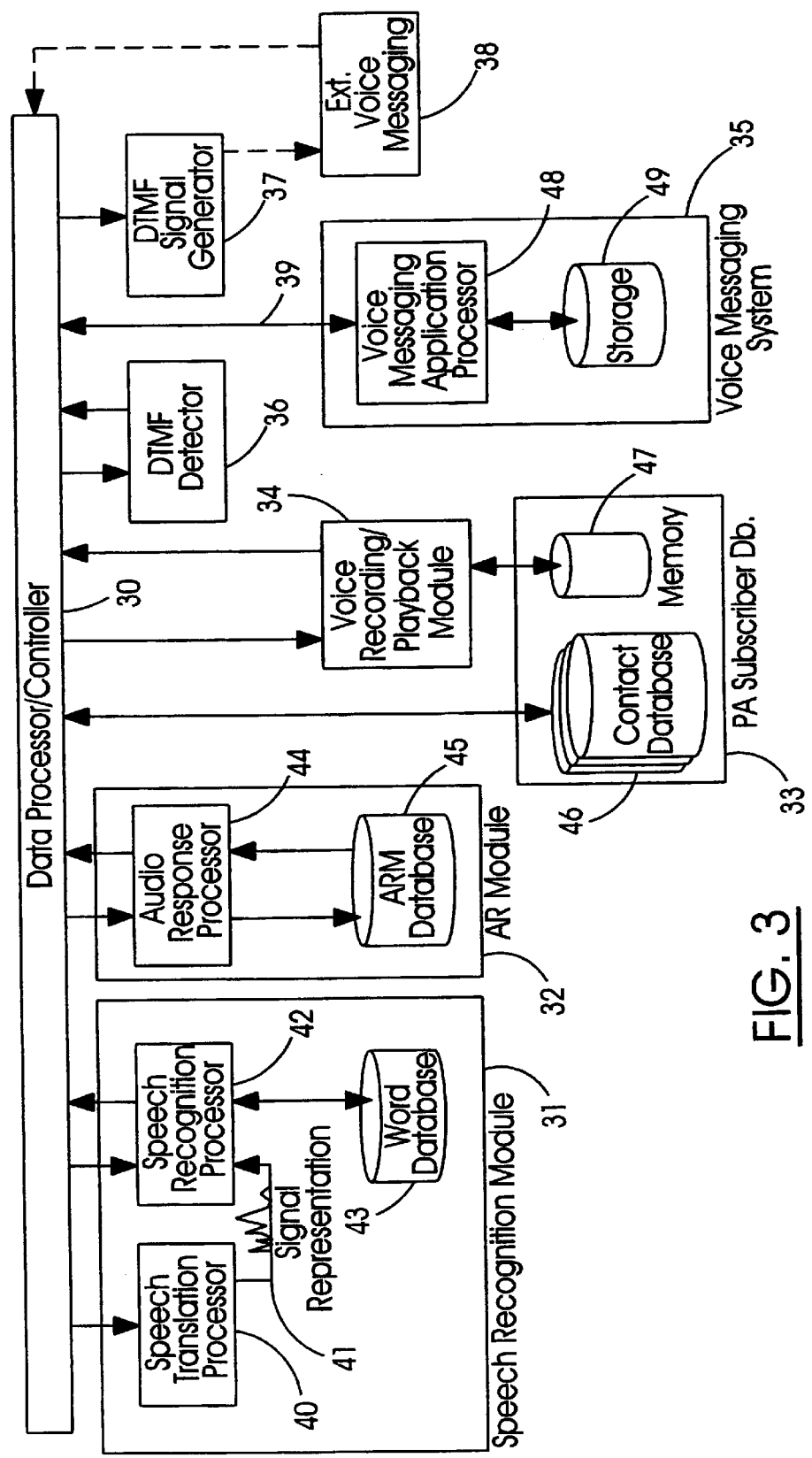
FIG. 3 is a block diagram of the Personal Agent processor of the present invention.

Referring now to FIG. 3, we have shown a block diagram of the application processor 21 shown in FIG. 2. The application processor 21 is comprised of a data processor/controller 30 which enables the control of the application processor's subsystems and the transfer of information and data to and from each subsystem. A speech recognition module 31 is used with the Personal Agent processor to enable a subscriber or calling party to communicate interactively using voice commands with the Personal Agent interface. An audio response module 32 is used to provide predetermined and prerecorded responses by the Personal Agent interface to a subscriber or calling party. That is, certain requests from a calling party or the subscriber may cause an audio response to be provided by the Personal Agent. This audio response would in most instances originate from the audio response module 32. The Personal Agent subscriber database 33, as indicated previously, contains the subscriber's personal directory, screening database, and other information necessary for the Personal Agent to interact with calling parties and the subscriber. A voice recording/playback module 34 enables the subscriber to record predetermined announcements and greetings for calling parties. In addition, the voice recording/playback module 34 is also used to record the spoken name of callers trying to reach the subscriber and the voices of contacts the subscriber may have in the contact database. A voice messaging system 35 enables the subscriber to make use of voice messaging features again using voice commands.

It should be noted that voice messaging system 35 is not necessarily integral with the Personal Agent platform. In some cases, the voice messaging system 35 will be provided by a third party supplier and connected to the data processor/controller 30 using a data link 39 to enable the Personal Agent to access envelope information used to identify the origination of various messages. In the preferred embodiment, the voice messaging system would be set-up to contact the Personal Agent data processor/controller 30 as soon as a caller has left a message. This way, a visual message indication would be provided. In addition, once the subscriber goes off-hook, the Personal Agent would be able to provide the subscriber with a message waiting status without having to re-access the voice messaging system. This message would for example, state "You have 1 personal and 2 business messages."

A DTMF detector 36 is provided for detecting DTMF signals which may be used by the subscriber or calling parties to by-pass the speech recognition module and activate predetermined commands or bypass others. Similarly, a DTMF signal generator 37 is used in the event that the Personal Agent interface requires access to an external voice messaging system 38 or to activate/deactivate features within a switch or a peripheral device connected to the switch.

Speech recognition module 31 is comprised of a translation processor 40 having a speech processing algorithm which processes the caller or subscriber's speech into a signal representation 41. The signal representation 41 is sent to a speech recognition processor 42 which makes use of a word database 43 to compare a word or words stored in database 43 with the subscriber's or caller's spoken word or words.

When a speech signal is received from the caller via the data processor/controller 30, the speech recognition module 31 stores the speech signal and executes instructions stored in the speech translation processor 40 to process the stored speech signal according to a predetermined algorithm. A representation of the speech signal which is suitable for input to speech recognition processor 42 is thereby derived. A speech recognition algorithm in the speech recognition processor 42 is applied to the representation of the speech signal to compute measures of probability that the translated speech signal corresponds to one or more signal representations of the words stored in the word database 43.

An example of word database 43 is shown in FIG. 4a. For each word or words stored in the word database 43 there is an associated signal representation and a command code. Once the proper signal representation is identified in response to a spoken word or words, the speech recognition processor 42 inputs the associated command code to the data processor/controller 30 to complete the operation requested by the speaker.

The audio response module 32 is comprised of an audio response processor 44 and an audio response module database 45. A sample number of audio responses stored in the ARM database 45 is shown in FIG. 4b. As in the word database 43, a corresponding command code is associated with each audio response. The predetermined audio response is provided to a subscriber or calling party in response to a predetermined action requested by the subscriber or the calling party.

Figure 5A:
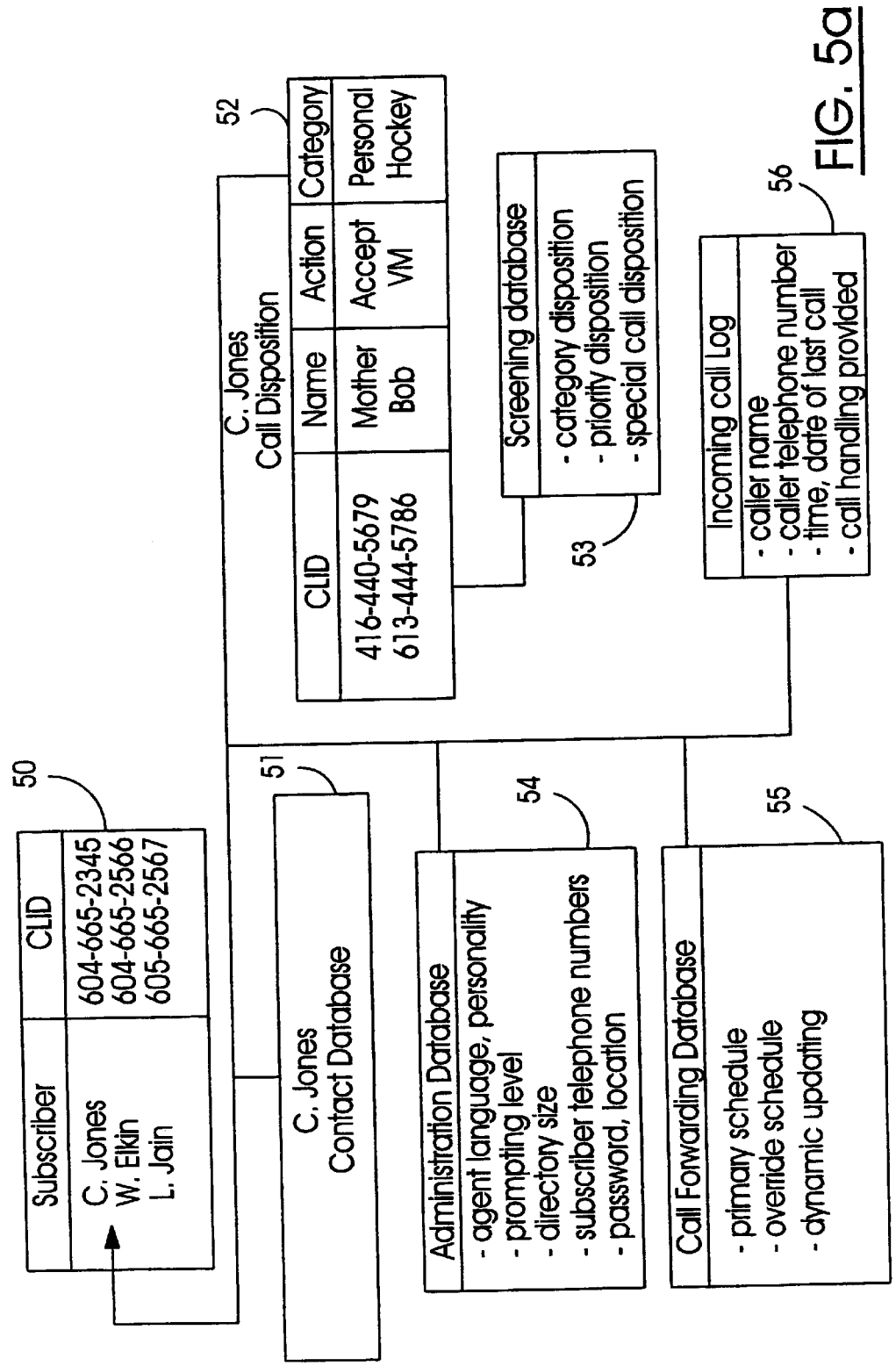
FIG. 5a are tables illustrating the database content of a typical subscriber profile.

The Personal Agent subscriber database 33 is comprised of multiple databases used by the Personal Agent to treat outgoing and incoming calls according to the predetermined profiles of subscribers. An example of the content of subscriber database 33 is shown in FIG. 5a. One of the Personal Agent subscriber databases 46 is the subscriber's contact database. It may also include a voice recording memory 47 for the playback module 34. Contact database 46 contains a list of the subscriber's contact names and telephone numbers. An example of a subscriber's contact database is shown in FIG. 5b. Memory 47 is used to store voice recordings of subscriber's greetings and messages as well as calling parties' names when requested by the Personal Agent. The Personal Agent makes use of the subscriber database 33 in order to place calls, add names to the contact database, identify callers and store call screening options.

Voice messaging system 35 is comprised of voice messaging application processor 48 and storage medium 49. As indicated previously, the Personal Agent interacts with the voice messaging system to enable the subscriber to retrieve, sort or identify messages using voice activated commands.

Referring now to FIG. 4a, we have shown a database table listing sample recorded words that can either be provided by the subscriber for recognition by a Speaker Dependent Recognition (SDR) algorithm or pre-recorded words for use with Speaker Independent Recognition (SIR) technology. One or more of these words may be combined to initiate a command or action on the part of the Personal Agent. Once the word or words are recognized, the associated command code is transferred to the data processor/controller 30 for interpretation. Once a command code associated with a subscriber request is received, an action may be taken by the data processor/controller 30 with or without feedback from the audio response module 32. For example, if the subscriber requires voice-activated dialing, an audio response from the Personal Agent may not be required. On the other hand, if the subscriber asks for a list of new messages, a response will be provided by the Personal Agent by providing the required audio response. Of course, the appropriate command code requested is based on the exchange of information between the data processor/controller 30, speech recognition module 31, PA subscriber database 33 and audio response module 32. The audio response module database shown in FIG. 4b provides a list of suitable responses for sending to the subscriber or a calling party.

As shown in FIG. 5a, a number of database tables are used in order to define a subscriber profile. One such table is the Personal Agent subscriber table 50 which, as indicated previously may reside at the telephone switching center database 19 showed in FIG. 1. The Personal Agent subscriber table 50 is used to determine whether a subscriber going off hook at one of a number of predetermined locations is a Personal Agent subscriber. As indicated previously, this is done in accordance with the network address of the telephone line used by the subscriber. The table could provide an indication of the location of the line's network address as well as the level of service provided to the subscriber. The table also provides information on the class of service available to the subscriber.

Once the identity of the subscriber has been confirmed from database 19, the information is used by the Personal Agent to access from the subscriber profile, a contact database 51, call disposition table 52, screening database 53, administration database 54, call forwarding schedule database 55 and incoming call log 56. As indicated previously, the contact database 51 provides a list of the subscriber's contact names and telephone numbers. An example of a contact database table is shown in FIG. 5b. The Personal Agent enables a subscriber using voice activated commands to place calls, add names to the contact database and identify callers with CLIDs stored in the subscriber contact database shown in FIG. 5b. For example, in order to reach a predetermined person, the subscriber would speak the person's name and location if the person can be reached at more than one location. A number of user controlled voice activated commands may be used to access the subscriber's contact database to make a call, add or remove a name, change directory numbers, review or look up the list of contacts, etc. Each voice activated command would be stored in a word database such as illustrated in FIG. 4a. It should be noted that the database contents shown in FIG. 5a are shown as examples only. It should also be noted that the content of the call disposition table 52 and screening database can be automatically changed according to the subscriber request for call disposition. For example, if the subscriber provides a screening command to the personal agent such as "Send all calls to voice mail. Exception 'mom' 'ring telephone'", the personal agent will alter the content of the call disposition table according to the requested command such that when the calling party's CLID is received, it is verified against the call disposition table. On the other hand, if no special screening commands is issued by the subscriber, then the contact database table may be checked first before checking the call disposition table or database 52. Thus, FIG. 5a is not meant to be construed as a illustrating an order in which tables are verified, but provide an illustration of various tables used by the personal agent system to provide call management for the subscriber.

An incoming call log 56 is dynamically updated as new calls are directed to the Personal Agent interface. The subscriber would be able to review a list of incoming calls that have been directed to the Personal Agent along with how the call was treated by the Personal Agent. Various voice activated commands can be initiated by the subscriber in association with the use of this incoming call log. These will be further described below with reference to Table 3.0.

Yet another table which forms part of the subscriber profile is the call disposition table 52 and screening table 53. The call disposition and screening tables 52 and 53 are used by the Personal Agent interface to screen incoming calls directed to the subscriber according to predetermined parameters defined by the subscriber. Once screened, the call is disposed of according to yet another series of parameters listed in the table by the subscriber. The subscriber has the ability to modify the tables at will via the Personal Agent interface using simple voice activated commands. As will be described further below, the subscriber has the ability to uniquely control the call disposition and screening table.

In order to facilitate the description of the features of the present invention, some of the features will be described using call flow diagrams starting at FIG. 6 in conjunction with the following tables.

Table 1.0 provides a list of telephony features which may be accessed with the Personal Agent of the present invention.

TABLE 1.0

| TYPE | FEATURE |
| --- | --- |
| VOICE MAIL | Access |
| | Message waiting status |
| | Message waiting indication |
| | caller identification |
| | play in any order |
| | call back |
| | can return to voice mail |
| | after call back |
| | message interception |
| | greetings based on CLID |
| | and/or dialed number |
| SUBSCRIBER ACTIVATED FEATURES | Place a regular or private call |

TABLE 1.0-continued

| TYPE | FEATURE |
| --- | --- |
| | Access to contact database |
| | Access to call logs |
| | request for information |
| | reminders |
| | busy re-dial |
| | call screening, trace, forwarding, waiting and call again |
| | audible calling party announcement |
| | check for call |
| | call waiting options |
| | cancel call waiting |
| | dynamic update of contact database based on useage |
| | call disposition profile updated according to subscriber's location when making first contact with agent |
| ADMINISTRATION | current settings reminder |
| | context specific help menu |
| | access to human operator |
| | password |
| | based on location |
| | subscriber name |
| | subscriber's telephone numbers: |
| | home, business, mobile, fax |
| | call waiting options |

Table 1.0 shows a general overview of the subscriber's features available. These can be activated using voice commands when the subscriber goes off-hook. The subscriber can access voice mail options by simply stating "voice mail" to the Personal Agent. Also, when greeted by a Personal Agent message such as "You have x new messages", the subscriber can ask "from who". A "Play message" or "Play message from 'x'" voice commands enable the Personal Agent to access the voice messaging system which allows the subscriber to hear the message stored for this particular caller. The subscriber activated telephony features listed in Table 1.0 are features that the subscriber can activate, de-activate or modify as required.

Each of the above-identified options can be utilized by the subscriber via the Personal Agent once the subscriber goes off hook and the agent is invoked. The Personal Agent would provide an indication to the subscriber that it is available for service by providing the subscriber with an audio greeting, such as "Hi, you have one new message". The subscriber would then activate a feature or command by speaking the term identified for that command or feature.

Figure 6:
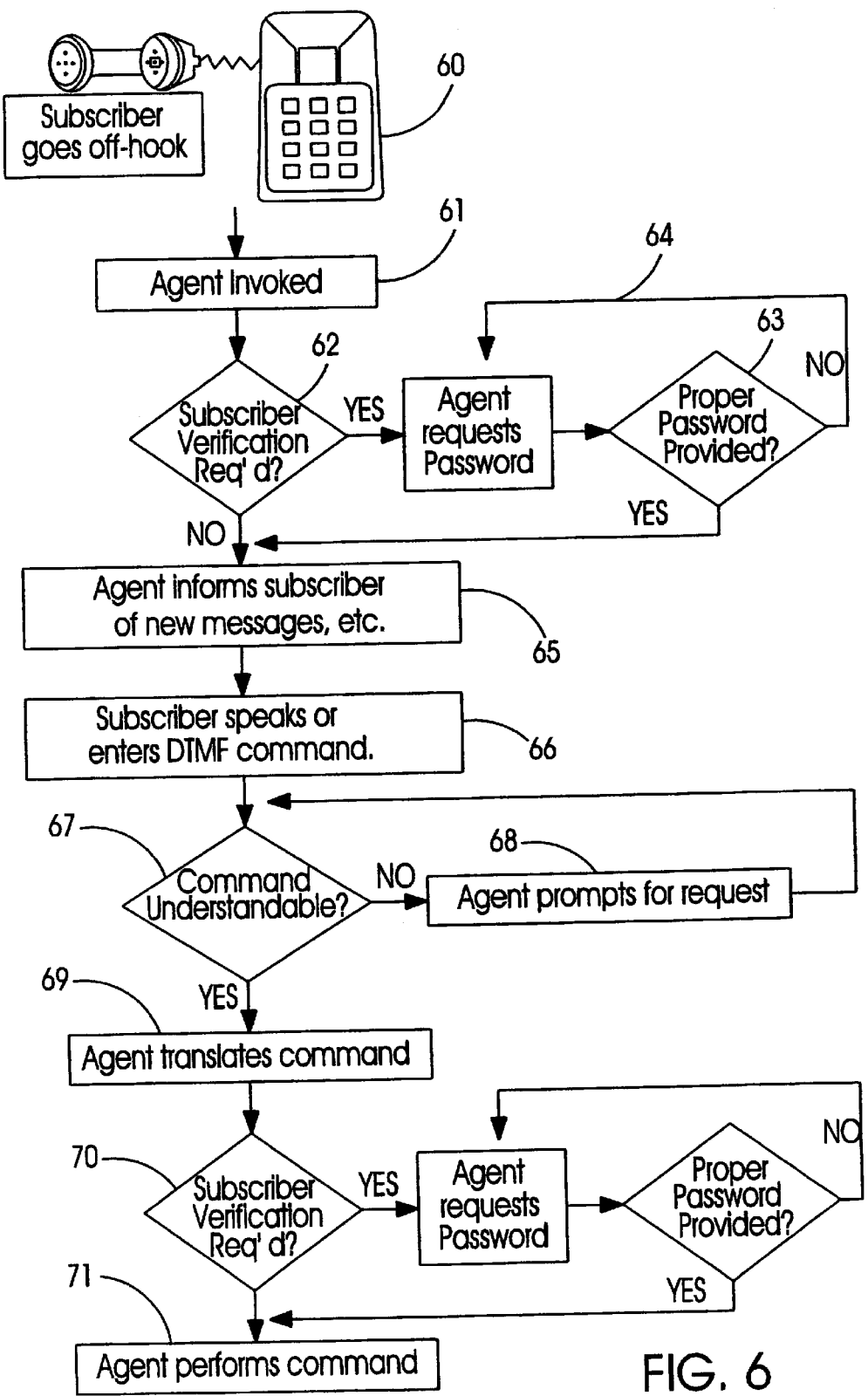
FIG. 6 is a flow diagram illustrating the call flow for a subscriber going off-hook.

An example of a typical subscriber/Personal Agent access scenario is illustrated in FIG. 6. Once the subscriber goes off hook from a pre-identified telephone station 60, the agent is invoked 61. If upon going off-hook, primary signalling is detected, regular (basic) call processing occurs and the agent is placed on standby. Alternately, the agent could drop off but be verbally re-invoked by the subscriber. This would require that the a voice detector and speech recognition module be placed on standby during the conversation. If subscriber verification is required 62, a password must be entered by the subscriber and verified at box 63. If the proper password is not provided, a dial tone can be provided at this point or the agent can request the password for one or more iterations at 64 if the proper password is not provided. User verification can also be speaker-dependent, i.e. based on the subscriber's voice print. At this point, if there are new messages, the agent will inform the subscriber 65. Otherwise, the subscriber can either speak to the agent or wait for a dial tone and enter DTMF tones 66. If the agent does not receive DTMF or voice signals within a predetermined amount of time, the agent drops off (remains on standby or dormant until it is re-invoked) and the subscriber receives a standard dial tone. A regular (basic) call proceeds as normal. If a DTMF or voice signal is received 67 a check is made to determine if it is understood. If the agent is unable to understand the voice command, a further request iteration is initiated by the agent at box 68. If the agent is able to understand a proper voice command, then a command translation is completed at box 69.

Since some commands may require user verification (if bypassed initially), an additional subscriber verification 70 may be requested. Otherwise, the agent performs the requested command at box 71.

Figure 7:
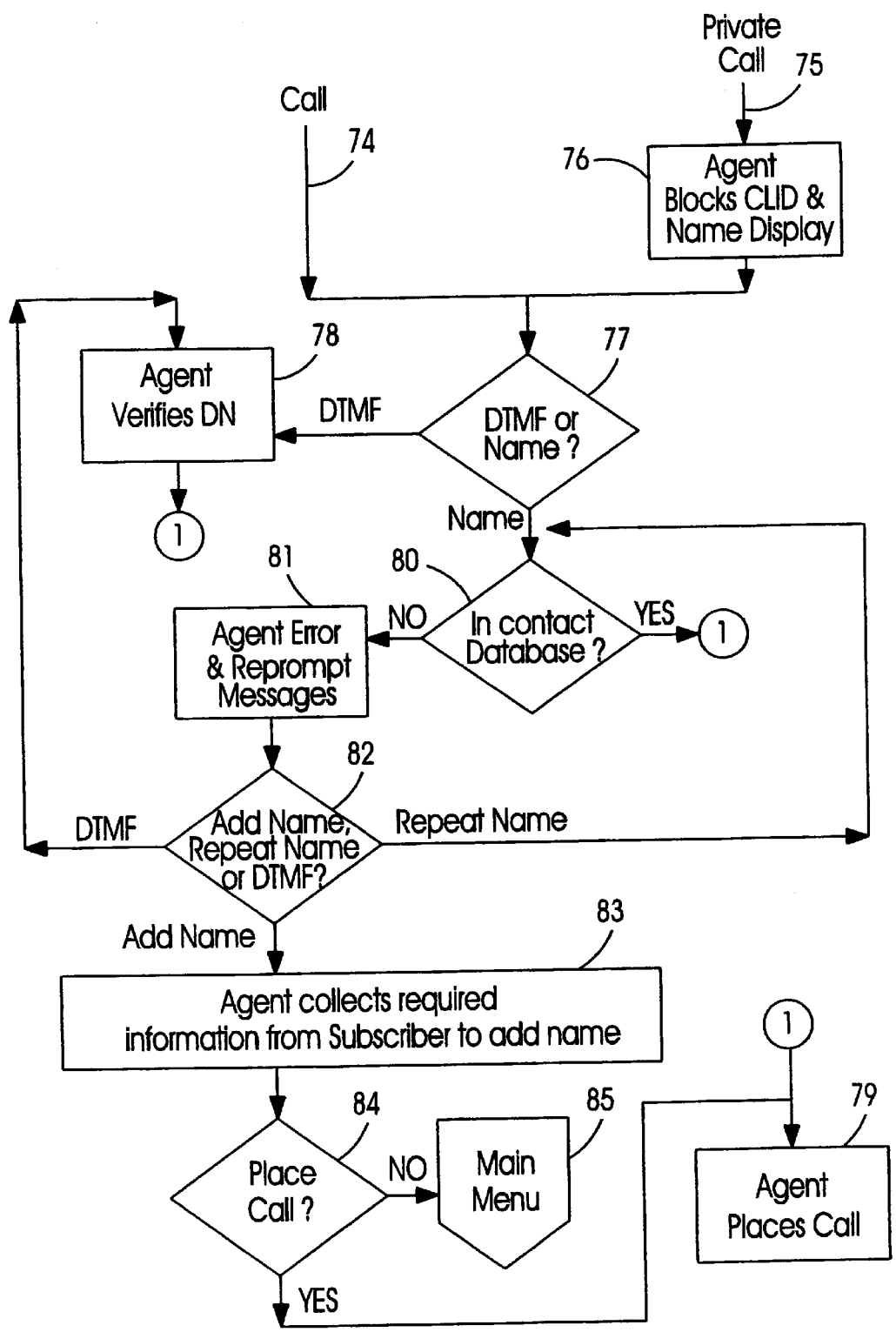
FIG. 7 is a flow diagram illustrating an outgoing call scenario.

Referring now to FIG. 7, we have shown a flow diagram for outgoing call scenarios for the subscriber wishing to make a call or private call, items 74 and 75 of FIG. 7. If the subscriber requested a private call 75, then a request to have the calling line ID of the subscriber blocked at the switch is made (box 76) prior to initiating the call. If a normal call is requested, the Personal Agent awaits DTMF or the name of a called party at box 77. If DTMF, the agent verifies the DN 78 and places the call 79. If a name is spoken, at box 80 a determination is made as to whether the requested name is in the contact database of the subscriber. If the name is not in the contact database, a further request iteration is required 81. Otherwise, the Personal Agent obtains the directory number of the requested name and places the call 79. If the requested name is associated with more than one telephone station, then the subscriber would have to specify the place where the call is to be made.

If the called party's line is busy or not answered, the agent will advise the subscriber accordingly and offer to perform another task. If the called party's line is not answered, the subscriber can issue a voice command (with telephone keypad backup) to return to the agent at which point the agent will offer to perform another task for the subscriber. If the called party's line is answered, the agent can either stay on line with the parties or drop off, in which case the subscriber will have to re-invoke the agent again in order to perform another agent function.

It should be noted that calls can also be placed while the subscriber is communicating with the Personal Agent and accessing other features such as contact database programming, at which point the subscriber would make use of the "call" command to request an outgoing call. A call can also be placed while the subscriber is accessing the incoming callers log.

If the spoken name is not in the contact database 81, the agent will ask 82 whether to add the name, repeat the name or use DTMF dialing. If the name is repeated, the contact database is verified again at box 80. If DTMF codes are entered, the agent verifies the DN at box 78. If the Add Name command is selected, the Agent collects the required information from the subscriber to add names 83. The call can then be placed 84 or the subscriber is sent to the principal Personal Agent menu 85.

As part of the telephony feature options, the subscriber can access his or her contact database once the Personal Agent is invoked by simply speaking "contacts" or "contacts database" to the Personal Agent. A list of voice-activated commands for the contact database is shown in Table 2.0.

TABLE 2.0

| TYPE | COMMAND |
|---|---|
| CONTACT DATABASE | CALL |
|  | ADD TO DATABASE |
|  | DELETE |
|  | CHANGE |
|  | LOOK UP A NAME |
|  | READ LIST |

The subscriber, with voice-activated commands can request a call to be made by the Personal Agent while reviewing the contact database. The name of a contact can also be stored using the contact's own voice for use with the audible calling party announcement feature. The subscriber can also add names and numbers, change database numbers, look up a name, review the list and remove an entry from the contact database list. DTMF signal back-up can of course be provided to enable the subscriber to complete any one of the above-identified functions. Categories of contacts can also be established, such as for a hockey or baseball team, etc. If applicable, a contact priority table as well as screening or call disposition can be included as well. The categories, screening and call disposition tables are modified by the subscriber as required.

The incoming call log feature enables the subscriber to review a list of new calls and/or a list of the last, say, fifteen callers. Table 3.0 shows a sample list.

TABLE 3.0

| LIST | TIME & Date | FREQUENCY | ENTRY | NAME |
|---|---|---|---|---|
| NEW ENTRY | 16:04 6 Sept | (ONCE) | (1) 514-829-1066 | JOHN DOE |
|  | 13.10 7 Sept | (TWICE) | (2) 613-516-2323 | SPOKEN NAME |
|  | 9:06 8 Sept | (ONCE) | (3) 604-774-2986 |  |
| OLD ENTRY | 9:16 1 Sept |  | (1) 613-516-2323 | JOHN DOE |
|  | 10:17 3 Sept |  | (2) 613-821-4017 | MARY JANE |
|  |  |  | (3) 604-721-8080 |  |
|  |  |  | . |  |
|  |  |  | . |  |
| SUBSCRIBER VOICE COMMANDS |  |  | CALL BACK ADD TO DATABASE SCREEN ERASE CALL DELETE ALL SAVE CALL |  |

The NEW ENTRY list contains a list of the callers that the subscriber has not yet reviewed including the names and/or telephone numbers. The OLD ENTRY list on the other hand contains a list of the callers that the subscriber has received calls from and been informed about.

In order to announce entries in the NEW ENTRY and/or OLD ENTRY lists, the Personal Agent attempts to match the incoming CLID of callers to the subscriber's contact database entries. This way, it enables the agent to announce the name of the calling party rather than the directory number. If the CLID is not in the subscriber's contact database, the agent may ask the calling party to say their name, if requested by the subscriber, otherwise the agent will announce the directory number or the name of the calling party delivered over the network using text to speech translation. Calling parties that have selected to block their CLID will be asked to say their name or will not be forwarded to the subscriber. When the agent reviews the new entry list, it will provide information about who called, the number of calls received from the person and the time of the last call attempt. Upon reviewing the list, the subscriber can interrupt the agent and at any time initiate a voice command, such as "call", "add to database", "screen", "erase call" or "delete all". With the "call" command, the agent will place an outgoing call to the appropriate party. With the "add to database" command, the command will be utilized by the subscriber if upon reviewing the NEW ENTRY or OLD ENTRY list, the agent announces the caller by playing the name of the calling party in the calling party's voice or the agent may make use of a text to speech synthesizer to speak the name calling party delivered over the network. The subscriber will know that the calling party has already been included in their contact database if the name announcement is in their own voice. With the "screen" command, the subscriber is allowed to screen calls from a particular CLID. The screening feature will be described in further detail below. With the "erase call" or "delete all" commands, the subscriber is able to delete items from their entry list. The incoming call log listing the NEW and OLD ENTRY lists is stored as part of the contact database or can also form part of a separate database.

Another feature is the subscriber's request to "check-for-calls". The "check-for-call" feature allows the subscriber to ask the agent if a particular person called. The Personal Agent matches the spoken name with the contact database names and then compares the CLIDs with the NEW ENTRY list of the incoming call log. In a sample dialogue, the subscriber would state to the Personal Agent "did John Doe call?". The subscriber could then use the "call" command to call that person. If the name is not in the contact database or it cannot be located with certainty, subscribers will be asked if they wish to add the name to their contact database.

Another feature available to a Personal Agent subscriber is the call screening feature. Table 4.0 shows the call screening categories and disposition.

TABLE 4.0

| OPTION | TYPE |
| --- | --- |
| CALL SCREENING CATEGOR-IES | ALL CALLS<br>PRIVATE (OR BLOCKED) CALLS<br>NAME<br>BY CATEGORIES IN DIRECTORY<br>BY NUMBER DIALED<br>BY PRIORITY SETTINGS |
| CALL SCREENING DISPOSI-TION | PASS THROUGH<br>ANNOUNCE CALLER<br>SEND TO VOICE MAIL<br>BLOCK MESSAGE<br>SCREEN MESSAGE<br>SEND RINGING<br>PLAY SPECIAL GREETING |

With the call screening feature of the present invention, screening can be set for all calls or a sub set of calls. Call screening is based on the above categories, namely all calls, private (or blocked) calls, specific names, by categories, by priorities assigned to the name in the contact database and by number dialed. Private calls are incoming calls that have been blocked by the calling party. All private calls can be routed to an agent announcement such as "The caller you are trying to reach does not accept blocked calls." This is the agent blocked message disposition which can be integrated with network-based anonymous caller rejection features if deployed. The screening of calls characterized as special are for calls from specific names. Each name can be routed to a different screening disposition. A certain number of special names can be allowed. For example, a nuisance caller CLID may be routed to the screen message which would sound something like "The caller you are trying to reach is not accepting calls at this time." Special calls can also be used to enable the subscriber to receive only one call. For example, a subscriber may be waiting for an important call and sends all calls to voice mail except for calls from a specific name or CLID associated with this special call. Calls can also be treated according to the category assigned to an incoming CLID in the subscriber's contact database, for example: everyone identified as a 'hockey team' member could be sent a special greeting. A priority setting can be set for each entry in a category such that different call priorities can be provided within the same category. Finally, calls can be routed according to which subscriber number was dialed.

The Personal Agent call screening disposition options include "connect", "announce caller", "send to voice mail", "block message", "screen message", "keep ringing" and "play special greeting".

The connect disposition option enables the subscriber to set the disposition of all calls, a group of calls, or specific calls including exception calls as "pass through". Incoming calls are directed by the Personal Agent to the subscriber's current location number. The Personal Agent in the pass through disposition option does not intercept or answer the call. If a no answer or busy condition exists, the Personal Agent will redirect the incoming call to voice mail.

The announce call disposition option enables the subscriber to set the disposition of all calls, a group of calls, or specific calls as "announce caller" options. In this option, incoming calls are answered by the Personal Agent if the agent doesn't have the name and/or CLID in the contact database or is not delivered by the network. If the incoming call is determined to be a voice call as opposed to a data call, the agent advises the caller that it will attempt to locate the subscriber. The caller is placed on hold while the agent attempts to contact the subscriber's current location number. The agent announces the calling party to the subscriber, and the subscriber will have the choice to either accept connection to the caller, send the caller to voice mail or play the block or screen announcement to the caller. In order to announce the caller, the Personal Agent checks the incoming CLID against the contact database entries of the subscriber. If a match is found, the agent will utilize the stored name to announce the caller. If a match is not found, the agent will use the name delivered over the network which is then translated (text to speech) to obtain an audible announcement. The caller's recorded announcement will be retained for the incoming call log and to announce incoming calls to the subscriber. With this call disposition option, the subscriber can ask the Personal Agent to play the block or screen announcement to the caller.

If the subscriber has selected an announcement disposition for the call, the agent will answer an incoming call. There are two message disposition options provided by the Personal Agent, namely: "block announcement" (similar to anonymous caller rejection) and "screen announcement". With the block announcement, the Personal Agent would tell the caller "The person you are trying to reach does not accept blocked calls." With the screen option, the Personal Agent would tell the caller "The person you are trying to reach is not accepting calls at this time" or provide a continuous ringing just as if no-one were home to answer the call. The agent will answer the call and advise the caller that there is a message for him or her. Upon playing the block message or screen message announcements, the agent will disconnect the calling party.

With the send to voice mail disposition option, incoming calls are directed by the Personal Agent to voice mail. The Personal Agent does not need to intercept or answer the call. Once the caller is routed to voice mail, the standard voice mail functions normally associated with voice mail are then accessible to the caller.

With the special greeting option, the subscriber can pre-record a greeting for a specific caller or group of callers. If the agent is relaying a subscriber message, the agent will ask the caller if they would like to leave a message for the subscriber.

It should be noted that the call screening categories and disposition will be tailored according the subscriber's schedule provided in the subscriber's profile of Table 5.0

Another feature offered by the Personal Agent is the "call trace" feature. In this case, the subscriber can ask the agent to initiate a call trace on a call. The record of the most recent call in the new calls log is copied and sent to the telephone company for processing. The subscriber then contacts the telephone company to obtain further information about the success of the call trace.

Yet another call management feature is the "call forward" option. The call forward option allows the subscriber to direct incoming calls to their current location. In order to permit this, the subscriber informs the agent as to their current whereabouts. This may automatically be done each time the subscriber contacts the Personal Agent from any location. The subscriber may identify one of the principal subscriber numbers by name, for example, "home", "work", "cellular". In the case of remote locations, the subscriber would identify the remote location by name, for example, by saying "here" or by saying a name in the contact database or by entering the telephone number through DTMF entries. If call forwarding is requested to areas requiring toll charges, a password may be requested.

Calls made via the Personal Agent by a subscriber would provide the subscriber's known public directory number associated with Personal Agent access as the CLID.

The administration feature enables the subscriber to review and change administration options, such as shown below in Table 5.0.

TABLE 5.0

| OPTION | ENTRY |
| --- | --- |
| SUBSCRIBER NAME | JOHN SMITH |
| WORK NUMBER | 619-828-8383 |
| Password required? | Yes |
| HOME NUMBER | 619-838-1078 |
| Password required? | Yes |
| CELLULAR NUMBER | 619-769-5623 |
| Password required? | No |
| PASSWORD | 5876 |
| LANGUAGE | ENGLISH |
| DIRECTORY SIZE | 50 |
| DISTINCTIVE RINGING | NO |
| DISTINCTIVE RINGING NUMBER | N/A |
| PROMPTING LEVEL | LOW |
| AGENT PERSONALITY | FEMALE |

With this option, the subscriber can review or change the recording of the subscriber's name, the subscriber's work, cellular or home telephone number, the subscriber's password or PIN number and any indication whether flags are required to indicate if access PIN numbers are required from their home, work and cellular locations. Access to the administration feature is password protected thereby requiring a subscriber to enter their PIN numbers.

Distinctive ringing may be used in association with the Personal Agent service of the present invention to assist the subscriber in differentiating between business and personal calls or calls meant for specific individuals in, say, the household.

Table 6.0 provides an example of the call forwarding schedule database. This table defines the default network addresses that the subscriber has selected for receiving calls during the identified time interval.

TABLE 6.0

| OPTION | ENTRY |
| --- | --- |
| WEEKDAY SCHEDULE | |
| A) 07:30–08:00 | CELLULAR |
| B) 08:00–17:00 | WORK |
| C) 17:00–17:30 | CELLULAR |
| D) 17:30–07:30 | HOME |
| WEEKEND SCHEDULE | |
| A) 0:01–23:59 | HOME |

Referring now to FIGS. 8*a*–8*d*, we have shown in a flow diagram a call scenario for the screening and prioritization of incoming calls when the subscriber is on-hook. When an incoming call is directed to a directory number that the subscriber has identified for call screening 86, the agent is invoked 87. Invoking the agent does not necessarily mean that the agent answers the call but simply that verification of the subscriber's call screening and prioritization parameters are verified before further routing the call. First the agent verifies whether the incoming call is voice or data 88. If the call is voice, a check is made 89 to determine if it has a CLID. If there is none or the CLID is blocked, the agent answers the call and asks for name and number at block 90. If a CLID is received, a determination is made to see if it is specified by the subscriber in the call screening and prioritization list. This is done at step 91 wherein if no call screening and prioritization is specified by the user, the agent then verifies call announcement option settings at block 92 in FIG. 8*b*. Otherwise the agent checks the calling line ID of the caller at block 93 and invokes the call screening and priority request of the subscriber. If the subscriber's request is to accept calls by ringing the subscriber's phone 94, then again the agent verifies call announcement option settings at block 92, otherwise a determination is made of whether the caller should receive an announcement at block 95. If the caller should receive an announcement, the agent routes the call to the appropriate announcement at block 96, otherwise a determination is made as to whether the caller is sent to voice mail at block 97. If the caller is to be sent to voice mail, the agent routes the call to an appropriate subscriber greeting for the voice mail system at block 98. If the call is a data call at block 99, then the agent routes the call to appropriate data storage 100. If the call announcement option setting at block 92 is selected, then the agent verifies whether the call announcement option is on or off at block 101. If the call announcement is off, the subscriber upon going off hook at block 102 will not receive an announcement. If call announcement is on at block 101, then a determination is made at block 103 of whether the calling line ID of the caller is in the contact database. If the calling line ID is in the contact database of the subscriber, the Personal Agent announces at block 104 the calling party upon the subscriber going off hook. If the calling line ID is not in the personal directory at block 103, the name delivered over the network is translated (text to speech) to obtain an audible announcement at block 105. A determination can be made to determine whether the subscriber wants to invoke that feature given the extra time required to obtain the information and to listen to the spoken announcement.

Figure 8A:
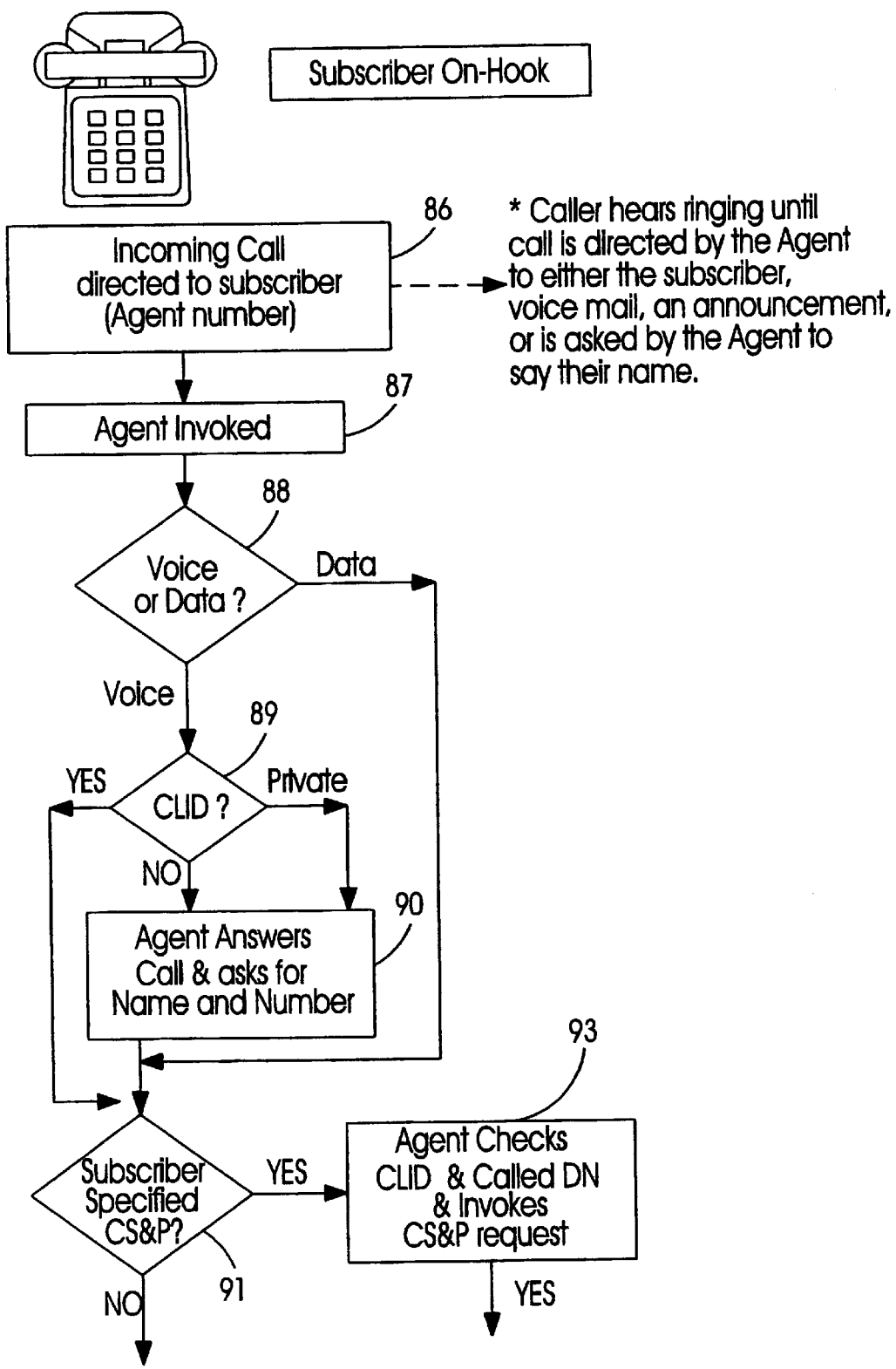
FIGS. 8a–8d are flow diagrams illustrating an incoming call scenario.
Figure 8B:
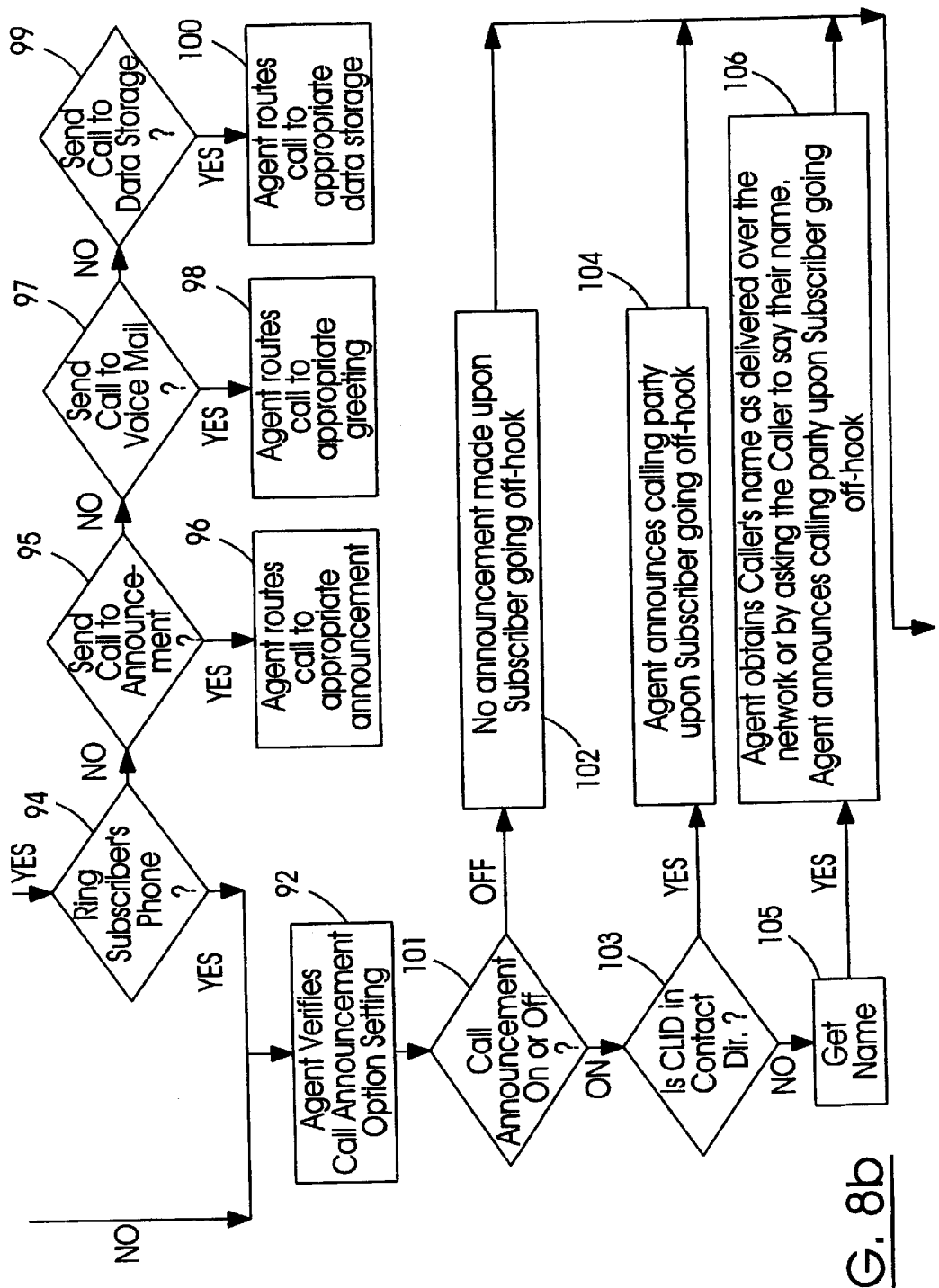
Figure 8C:
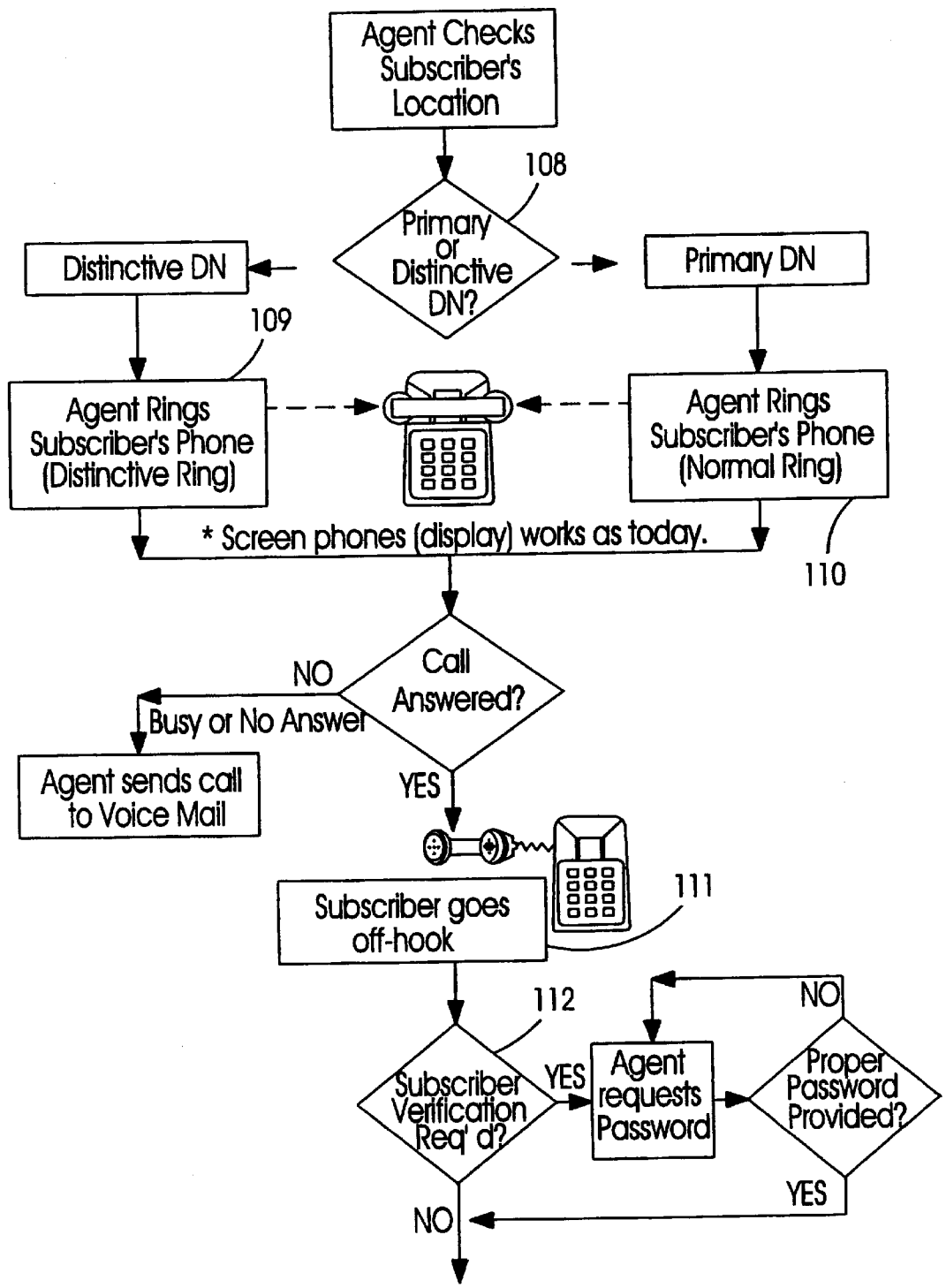
Figure 8D:
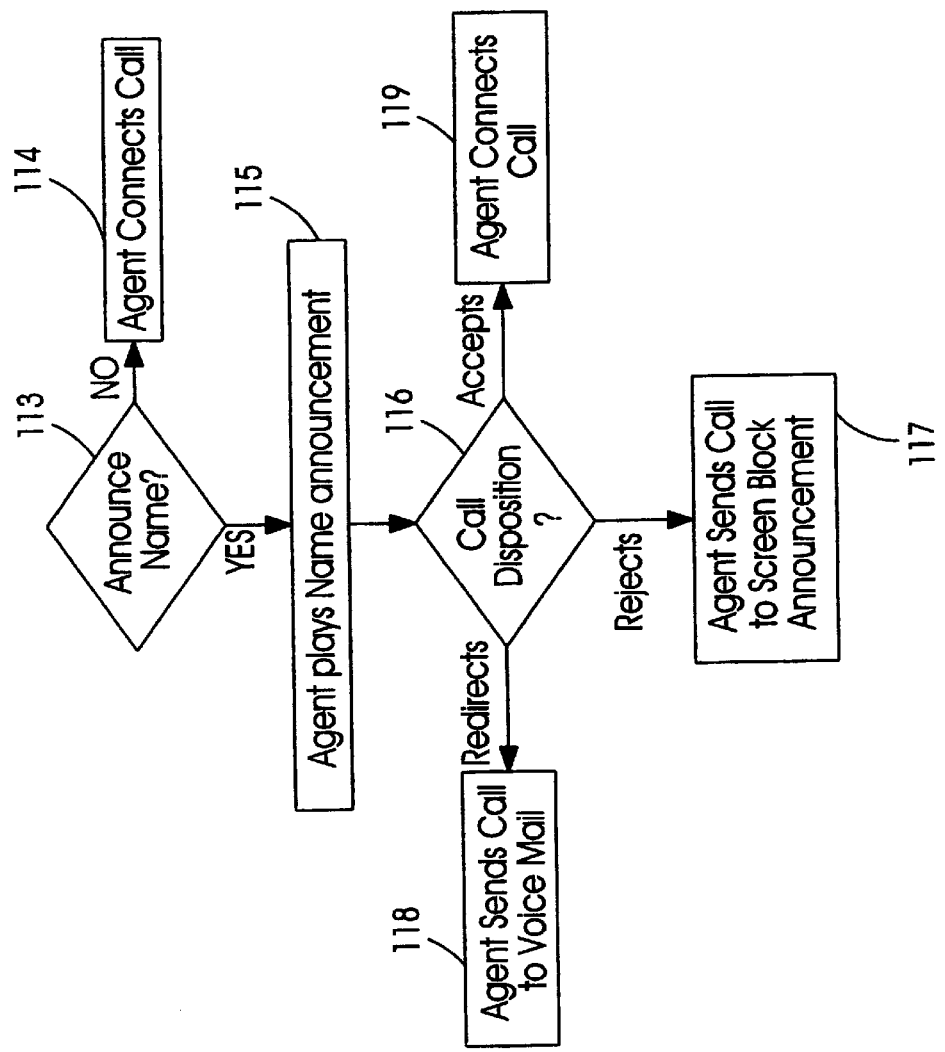

If necessary, a further identification of whom should receive the incoming call is made based on a determination of whether the call is directed to a primary or secondary directory number at block 108 of FIG. 8c. If call identification is required, then the specified ring is provided to the subscriber before the subscriber goes off hook at block 109, otherwise the normal ring is provided to the subscriber, block 110. The subscriber then goes off hook to answer the call 111. If necessary subscriber verification may be required at block 112. A determination is then made at block 113 of FIG. 8d of whether to announce the name of the caller. If the call announcement is off, the agent will connect the call 114, whereas if the call announcement is on, the agent plays the appropriate announcement to the subscriber 115. Upon receiving the announcement, the subscriber can decide whether to accept, reject or redirect the call 116. If the call is rejected 117, the agent forwards or sends the call to Screen Block Announcement. If the call is redirected 118, it is sent to voice mail whereas if the call is accepted 119 by the subscriber, the agent connects the call.

Once the subscriber has access to the Personal Agent system a message waiting status such as number of messages waiting and who the messages are from is provided.

This message waiting status will be based on CLID of the callers who have left messages. The subscriber can then request the Personal Agent to play the messages in any order or return calls or send messages at any time.

In order to make sure that the subscriber receives an indication of messages waiting to be heard, the Personal Agent provides message waiting indicator to the subscriber's current location. Accordingly, a subscriber would receive a message waiting indication at home, business or cellular numbers.

Another feature which the subscriber can access via the Personal Agent interface is voice mail. The subscriber can access the voice mail via the agent by using a voice command "voice mail". Once connected to the voice mail system, subscribers can perform any of a number of operations using voice-activated commands. If the voice mail system forms an integral part of the Personal Agent interface of the present invention, the Personal Agent acts as the interface thus providing complete flexibility in handling stored messages. The specific functionalities of the interface with a voice mail system is described in applicant's co-pending application serial number . . . . If the subscriber requires access to an external voice mail system, the voice mail commands are replaced by DTMF tones and IVR as is currently done for voice mail operations today. The agent would connect the subscriber to the voice mail system. Once the voice mail system is released or disconnected, the agent comes back on-line to perform tasks for the subscriber. It should also be noted that while in the voice mail system, the subscriber can initiate a call return based on information received from the Personal Agent.

The control of voice messaging platform is again done via voice activation interaction with the user's Personal Agent. Since the Personal Agent acts as the interface to the subscriber, the Personal Agent would have access to the voice message system access number, mailbox number and password from the subscriber database profile.

The subscriber can also record additional voice mail greetings to make the voice message system more user friendly to incoming callers. The voice mail greeting played to the calling party would be tailored based on calling line ID of the calling party or the called number of the calling party. Thus, if the caller tries to reach the subscriber at the business number, a greeting indicative of a voice mail system for business calls would be provided to the calling party whereas if the calling party is attempting to reach the subscriber at his or her home number, a more social greeting announcement would be played by the voice mail system.

When the subscriber requires access to a message which has been left by a predetermined calling party, calling party identity is retrieved from the voice mail system using indexing of voice message information stored in the voice mail storage medium. The stored information may be packetized in PCM synchronous format as is currently done in many voice mail storage systems. Thus, when voice messages are retrieved from the storage medium, they are depacketized for transmission to the Personal Agent and then on to the subscriber.

As in previous Personal Agent features, the subscriber can also make use of DTMF commands to bypass voice activation.

Another feature which is enhanced by means of the Personal Agent service of the present invention is the call waiting option. With reference to FIGS. 9a–9f, we have shown a flow diagram of a call waiting scenario. As indicated in the background of the invention, call waiting service currently offered by telephone service providers lets the subscriber know if another call from a third party is waiting while the subscriber is on-line with another party. The subscriber hears a soft beep for local calls and a long-short-short beep for long distance calls. In the embodiment of the present invention, a Personal Agent subscriber who is currently on a call and who receives an incoming call at block 120 will not immediately receive the standard call waiting tones. Instead, the Personal Agent is invoked at block 121. The Personal Agent determines if the call is voice or data 122. If the call is data, it is treated according to the subscriber's specified call treatment at block 123. If the call is voice, the agent determines whether or not CLID is provided or blocked 124.

If no CLID is provided or the call is a private call, the agent answers the call and asks for the name and number of calling party at block 125. Otherwise a determination is then made by the Personal Agent at block 123 of whether the subscriber has specified the call screening and prioritization parameters. If the subscriber has specified the call screening and prioritization parameters, the agent checks at block 124 for incoming calling line ID, called DN and specified screening and prioritization. If the call is a data call it is sent to data storage 126. A determination is made at block 127 to determine whether to send an announcement to the calling party. If so, the agent at block 128 routes the call to appropriate announcement. If no caller announcement is specified at block 127, then a determination is made of whether the caller should be sent to voice mail at block 129. If the caller is to be sent to voice mail, the agent at block 130 provides the appropriate greeting for the calling party. If incoming call waiting calls are not to be sent to voice mail, then the agent determines if the call waiting option is on or off at box 131. Depending on the call waiting option settings determined at box 131, the caller is routed to voice mail at box 132 with an appropriate greeting. If the subscriber's current or initial call is data, the agent routes the incoming call to voice mail 133 otherwise, the subscriber is on a voice call. A determination is then made at block 134 of the priority of the initial call. If it is a priority call, should the call be interrupted at block 135. If no, the agent routes the call to appropriate announcement 136. If interruption is allowed, a further determination of whether an announcement is obtained at block 137 and 138. If no announcement is to be made, the agent verifies the call waiting settings 139 to determine whether the notification should be SCWID 140, CW tone 141 or tone and announcement 142. If the CLID is in the contact database 143 the subscriber receives the calling party's name after the tone 146. If there is no corresponding CLID in the database, the agent translates the name delivered over the network. If there is no announcement, agent provides tone at block 147. Call disposition by the subscriber is as illustrated earlier.

Figure 9A:
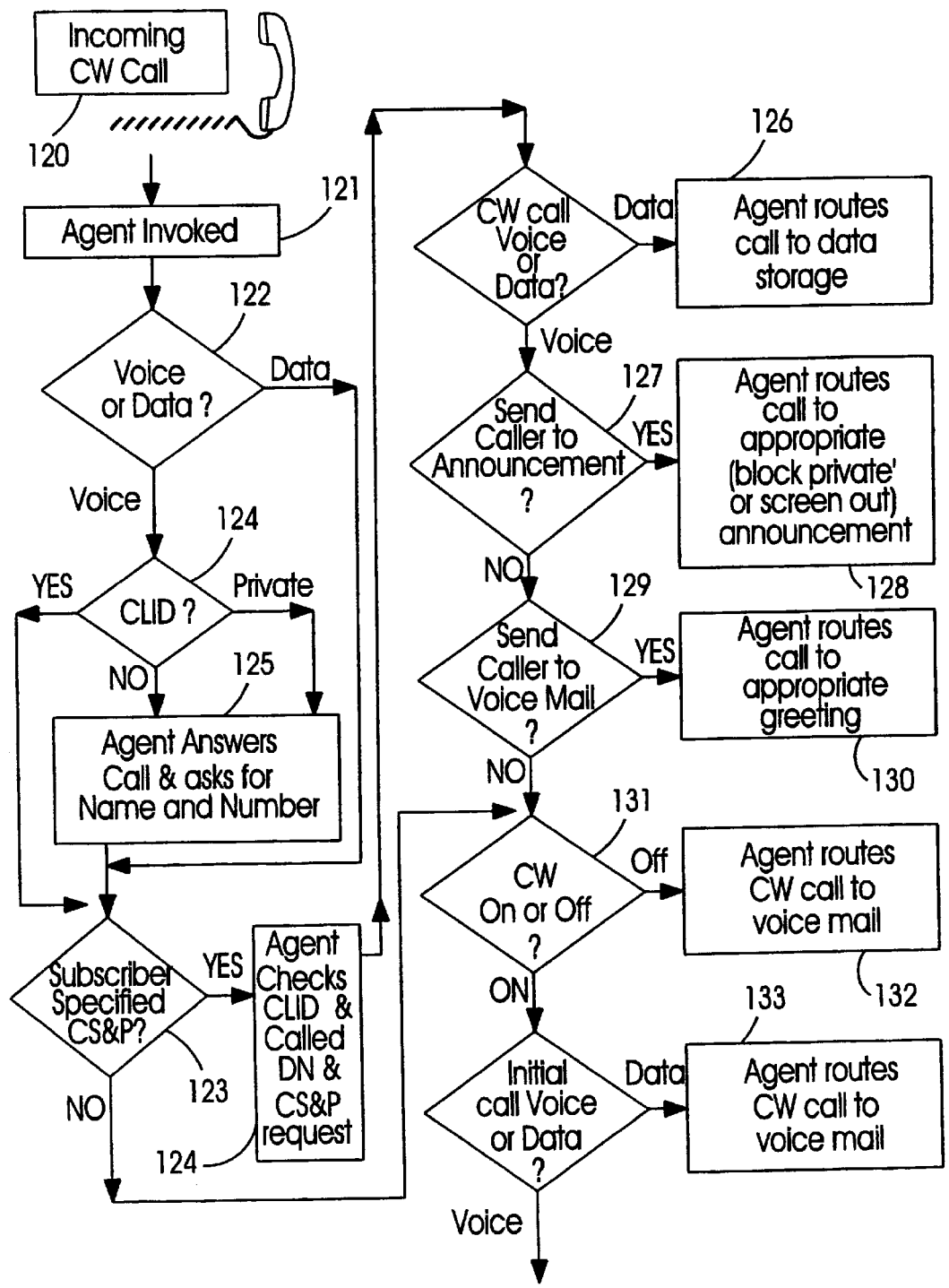
FIGS. 9a–9e are flow diagrams illustrating a call waiting scenario according to the Personal Agent interface of the present invention.
Figure 9B:
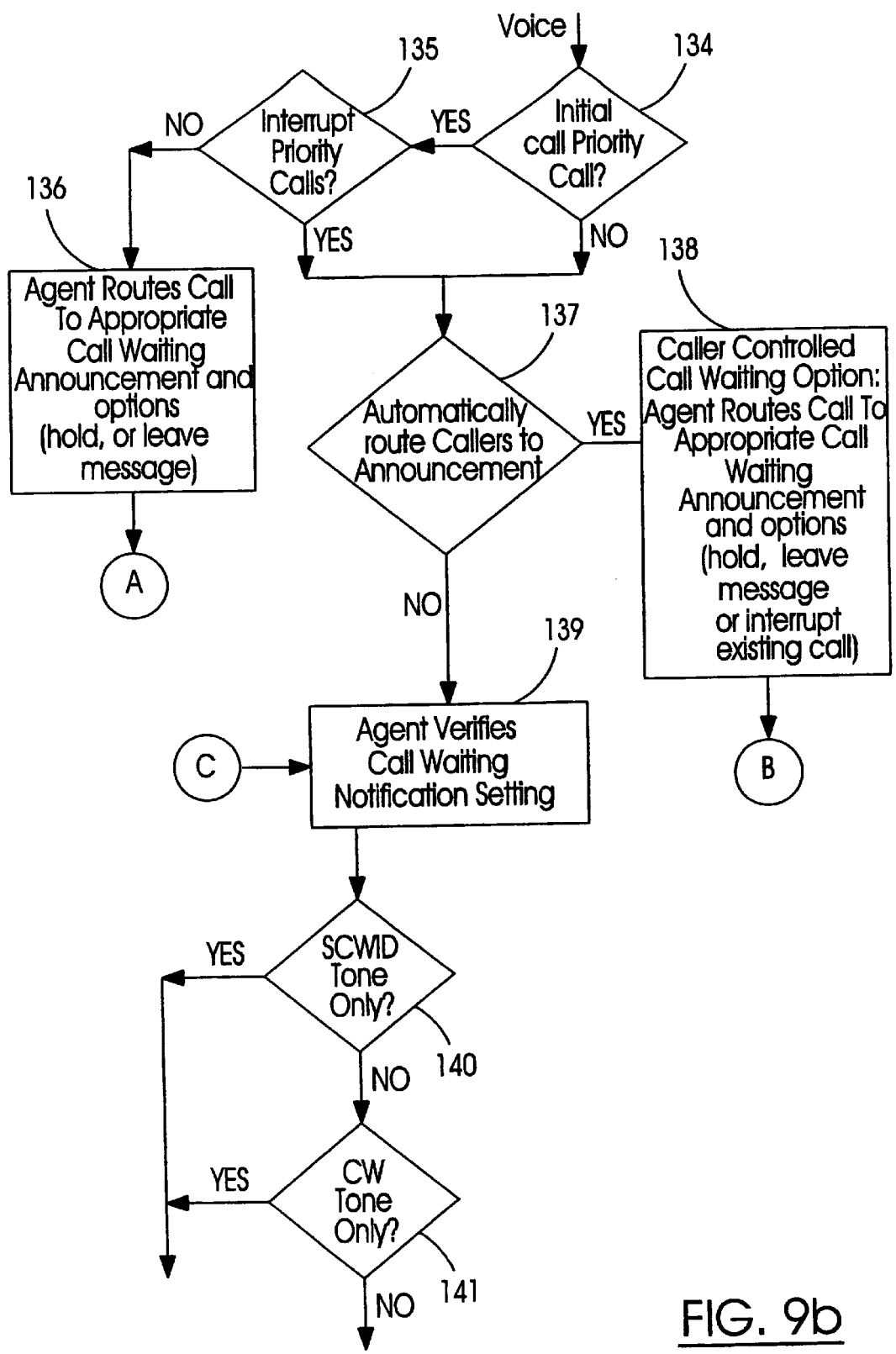
Figure 9C:
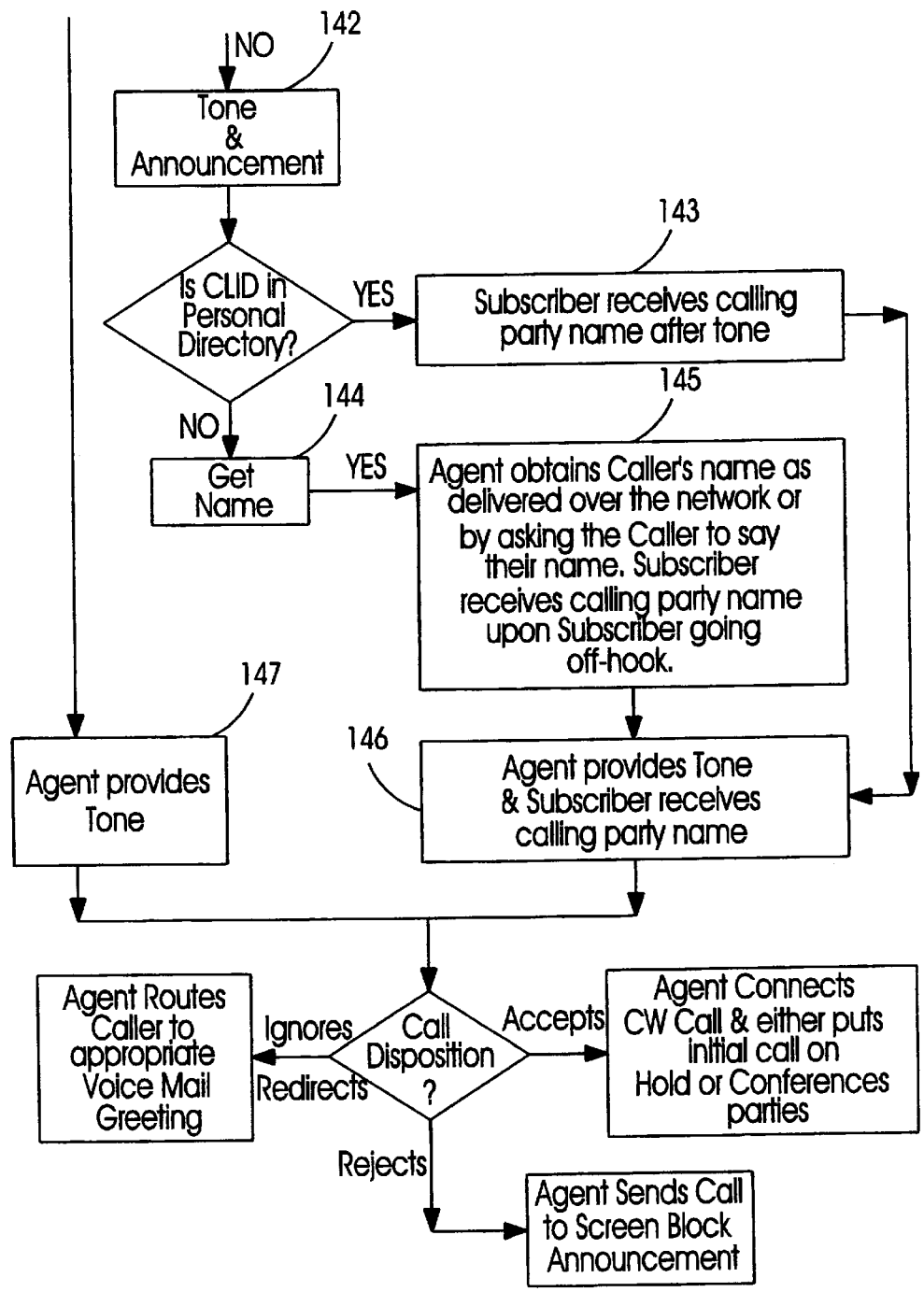
Figure 9D:
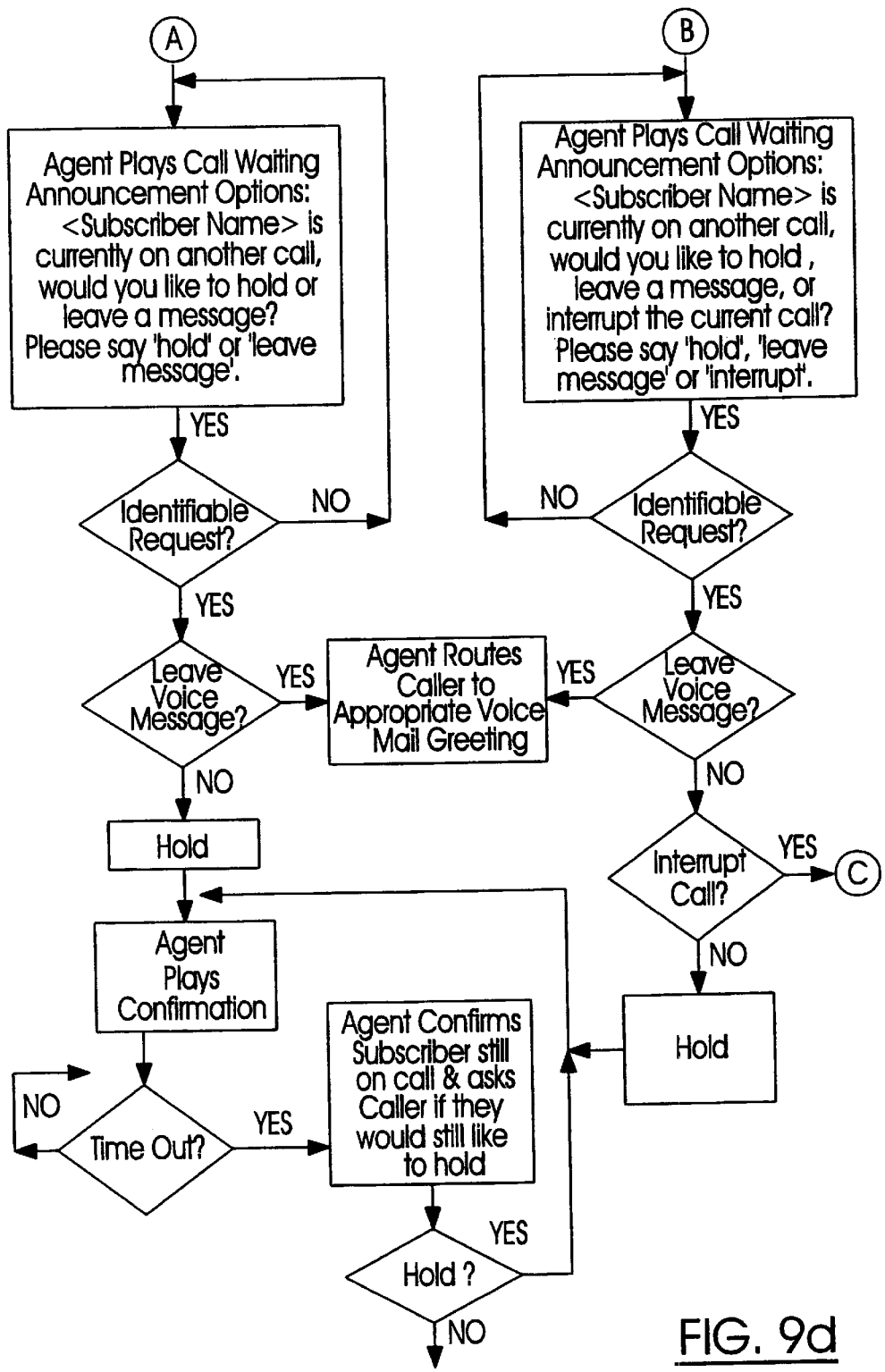
Figure 9E:
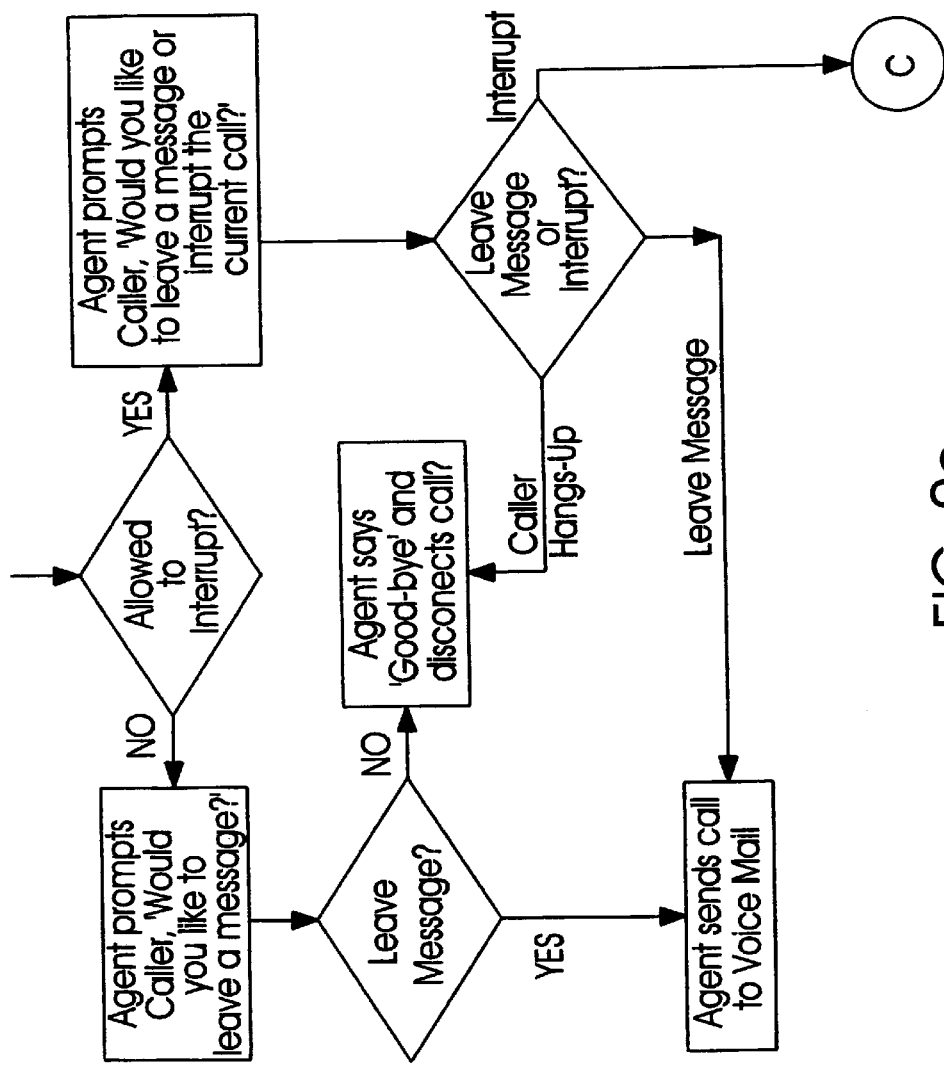

In scenario B of FIG. 9d, if an announcement is to be played, the call waiting caller will hear an announcement outlining options such as "Hi, this is Joe, I am on another call at the moment, please press 1 if you would like to leave a message, press 2 if you would like to hold or press 3 if you would like to interrupt my current call." Scenario A does not allow the caller to interrupt the subcriber's current call. As indicated earlier, these announcements would be retrieved by the Personal Agent from voice recording/playback module 34 shown in FIG. 3. The calling party can either enter the aforementioned DTMF tones or request an option by means of voice-activated commands. The voice-activated commands would be treated by means of speaker-independent technology to permit the Personal Agent to recognize requests from unknown parties. If the calling party does not respond or the response cannot be identified, then the caller is returned to the agent for receiving further prompts from the agent. If a response is received from the calling party, then a determination is made as to whether the calling party wishes to leave a voice mail message, hold for the subscriber, or interrupt the call. If the calling party wishes to leave a voice message, the agent would then route the caller to the appropriate voice mail greeting. If the caller wishes to hold, then the agent would route the caller to an appropriate announcement and provide the subscriber with the call waiting tone. If the calling party has selected to interrupt the call, the agent would first verify the call waiting treatment option before sending a call waiting tone to the subscriber.

In scenario A, callers can automatically be asked to hold with an appropriate announcement. For example, if the subscriber is on another line, the call waiting caller is automatically routed to the subscriber call waiting announcement "Hi, this is Joe, I am on another call at the moment, please hold and I will be right with you or if you would like to leave a message say 'message' and I will return your call as soon as possible." The subscriber is provided with a call waiting tone to indicate a caller is holding. When the subscriber completes the first call, the Personal Agent will announce the calling party before connecting the call waiting call, unless the subscriber has turned off the announcement option.

What we claim is:

1. A method of providing an interactive Personal Communication Services (PCS) Agent to permit a subscriber using voice commands, to interface with various communication services and tailor incoming and outgoing call treatment according to a predetermined PCS Agent service profile from any one of a number of telephone network addresses, comprising the steps of:
   a) determining whether a request for service is associated with a subscriber of said PCS Agent;
   b) determining whether the request originates from an authorized network address associated with said subscriber;
   c) if the request originates from an authorized network address associated with the subscriber, establishing a communication path from a telephone switching centre serving said network address to an application processor for providing said PCS Agent service; and
   i) when required of said subscriber for making outgoing call, activating a predetermined application processor module to enable interaction between said subscriber and said PCS Agent Service for outgoing call treatment; else
   d) if said request is caused by an incoming call directed to a predetermined network address associated with said subscriber;
   ii) accessing said subscriber's PCS Agent service profile to enable said application processor to route said incoming call according to a predetermined call treatment established by said subscriber.

2. A method as claimed in claim 1, wherein said request for service is determined to be associated with a subscriber of said PCS Agent service by querying a first database containing a list of said subscribers using a dialed number associated with the request.

3. A method as claimed in claim 2, wherein the request for service is determined to originate from an authorized network address when said subscriber goes off-hook at a telephone having a network address identified in said first database.

4. A method as defined in claim 3, further comprising placing a predetermined application processor module on standby once said request for service is determined to be associated with an authorized network address.

5. A method as defined in claim 2, wherein said subscriber's PCS Agent service profile is accessed by querying a second database.

6. A method as defined in claim 4, further comprising activating a predetermined application processor module according to whether DTMF or voice commands are initially received by said application processor.

7. A method as defined in claim 6, wherein a dial tone is sent to said subscriber telephone if no input is received from the subscriber within a predetermined time limit.

8. A method as defined in claim 6, further comprising activating an audio response module if an indication is received at said application processor that one or more messages have been stored for the subscriber.

9. A method as defined in claim 6, further comprising the step of placing a speech recognition module on standby when said subscriber goes off-hook in the event that the subscriber inputs a voice command to said application processor.

10. A method as defined in claim 6, further comprising the step of placing a DTMF detector module on standby when said subscriber goes off-hook in the event the subscriber inputs a DTMF signal to said application processor.

11. A method as defined in claim 3, wherein said communication path is established between said authorized network address and said application processor when said subscriber goes off-hook at a telephone associated with an authorized network address.

12. A method as defined in claim 5, wherein a request for service is determined to be caused by an incoming call when said telephone switching centre receives an Initial Address Message (IAM) indicative of an incoming call to a subscriber network address associated with said PCS agent service.

13. A method as defined in claim 12, further comprising the step of querying said second database to determine a subscriber's incoming call treatment before establishing a communication path between a calling party and a network address associated with the subscriber receiving the call.

14. A method as defined in claim 1, further comprising the step of forwarding identity information related to said service subscriber to enable the application processor to access the subscriber's PCS Agent service profile.

15. A method as defined in claim 14, wherein said identity information comprises Calling Line Identifier (CLID).

16. A method as defined in claim 9, wherein said PCS agent interfaces with said subscriber by:
receiving said voice command at said speech recognition module if a voice command is input by the subscriber;
translating said voice command to a speech signal;
comparing said speech signal to signal representation of predetermined stored commands;
sending a code to a data processor indicative of the voice command input by said subscriber; and
activating a predetermined application processor module according to the recognized command action required by said predetermined application processor module.

17. A method as defined in claim 8, wherein a message waiting indication is sent to each telephone device identified in the subscriber's PCS agent service profile.

18. A method as defined in claim 13, wherein a communication path is established with a voice messaging module if said second database query is indicative of a voice message call treatment for the call associated with said IAM.

19. A method as defined in claim 13, wherein said call treatment comprises the activation of a call screening and prioritization service tailored to the subscriber's profile.

20. A method as defined in claim 16, wherein voice activated dialing (VAD) can be provided by said PCS agent to said subscriber by:
receiving, at said speech recognition module, a predetermined voice command indicative that said subscriber requires the VAD feature, along with the name of the called party;
obtaining an appropriate command code from the speech recognition module associated with a VAD request;
obtaining an appropriate name code from the speech recognition module associated with the spoken name of the called party;
retreiving the called party's telephone number from said subscriber profile corresponding to said name code; and
activating a DTMF generator to dial the called party's telephone number.

21. A method as defined in claim 3 wherein said request for service is determined to originate from an authorized network address when said subscriber enters an authorization code at a telephone having a network address which is not identified in said first database.

22. A method as claimed in claim 21 further comprising the steps of:
receiving said authorization code at said application processor providing said PCS service agent;
verifying said authorization code against a list of authorization codes associated with said subscribers; and
when required, activating a predetermined application processor module to enable interaction between the calling subscriber and said PCS agent service.

23. A method as defined in claim 22, wherein said step of verifying further comprises requesting said subscriber to speak a voice print identification word to enable said application processor to verify the authenticity of the calling party.

24. A method as defined in claim 8, wherein said audio response module is activated in response to a message waiting query made by said subscriber via said PCS agent service.

25. A method as defined in claim 24, wherein said message waiting query comprises a request for at least one of the caller's name, the caller's telephone number, the time and date of the call.

26. A method as defined in claim 16, wherein said voice activated command comprises a request for at least one of initiating a call using voice-activated dialing based on the called party's name, initiating a call using voice-activated dialing using the called party's number, initiating a private call wherein the subscriber's calling line identification is kept private, reviewing the subscriber's list of contacts, reviewing the subscriber's incoming callers log, checking for a specific call from said incoming callers log, setting the screening parameters for incoming calls, reviewing said screening parameters, initiating call-forwarding, reviewing greetings for voice messages and calls waiting features, requesting said PCS agent service to provide the name of a caller identified in said message waiting indication, setting up a conference call, activating and de-activating call screening and prioritizing features, reviewing and setting schedule parameters, accessing said subscriber's service profile, initiating a reminder for said subscriber, and accessing administrative features of the PCS agent services.

27. A method as defined in claim 5, wherein said subscriber's PCS agent service profile comprises at least one of the subscriber's preferred language settings for interfacing with said PCS agent service, said subscriber's name recording in said subscriber's own voice, a password for remote access authorization, a subscriber list of authorized telephone numbers from where said subscriber can interface directly with said PCS agent service, a subscriber password setting to identify security levels when said subscriber accesses said service profile and a class of service available to said subscriber at each of said network addresses authorized by said subscriber.

28. A method as defined in claim 27, wherein said subscriber profile further comprises a contact database having at least one of a default schedule for automatically changing call forwarding locations to a predetermined network address selected by said subscriber, an override schedule activated by said subscriber to take precedent over said default schedule, and a day-of-the-week and time-of-day schedule to enable said subscriber's PCS agent to route incoming calls according to a call treatment defined by said subscriber in said schedule database.

29. A method as defined in claim 27 wherein said PCS subscriber service profile further comprises a contact database having at least one of a list of contact names in the subscriber's own voice, a list of contact names in the contact's own voice, a list of contact telephone numbers identifying the contact's work, home, cellular, fax and other telephone numbers identifying said contact, a list of contact categories defined according to said subscriber's requirement, a contact priority list identifying call screening and prioritization levels for each of said contacts, and a specific screening disposition entry identifying a unique call screening and prioritization level for one of the contacts on said list.

30. A method as defined in claim 28, wherein a network address identified in said schedule database where said subscriber can be reached is automatically updated according to which network address said PCS subscriber is initiating a request for service from.

31. A method as defined in claim 28, wherein selective call forwarding can be requested by said PCS agent subscriber by instructing said PCS agent while said subscriber is reviewing said subscriber schedule database to activate call screening and allow calls from a predetermined contact identified in a subscriber's contact database.

32. A method as defined in claim 12, further comprising intercepting at said PCS agent other incoming calls while said subscriber is off-hook on an existing call if said incoming call provides an initial address message (IAM) indicative of a call directed to any one of said subscriber network addresses associated with said PCS agent service.

33. A method as defined in claim 32, wherein said step of intercepting said other incoming calls comprises screening the incoming call according to the subscriber's service profile.

34. A method as defined in claim 33, wherein said step of screening comprises providing a call waiting option provided by said PCS agent.

35. A method as defined in claim 34, wherein said call waiting option comprises at least one of providing a special call waiting announcement based on a predetermined call screening parameter, requesting speaker verification, determining call priority between said incoming call and said existing call.

36. A method as defined in claim 16, wherein said PCS subscriber can request access to said voice messaging system by a voice-activated command directing the Personal Agent to activate a voice messaging system module in accordance with said PCS subscriber's service profile.

37. A method as defined in claim 36, wherein access to said voice messaging system module is provided to said PCS subscriber using voice-activated commands directing the subscriber to stored information containing at least one of stored messages, message greetings, and call return feature based on any one of the stored messages.

38. A system for providing an interactive Personal Communication Services (PCS) Agent to permit a subscriber using voice commands, to interface with various communication services and tailor incoming and outgoing call treatment according to a predetermined PCS Agent service profile from any one of a number of telephone network addresses, comprising:
 a) means for determining whether a request for service is associated with a subscriber of said PCS Agent;
 b) means for determining whether the request for service originates from an authorized network address associated with said subscriber;
 c) means for establishing a communication path from a telephone switching centre serving said network address to an application processor providing said PCS Agent service;
 d) an application processor module to enable interaction between said subscriber and said PCS Agent Service to tailor incoming call treatment and outgoing call treatment for subscriber generated outgoing call; and
 e) means for storing said PCS agent service profile such that if said request is caused by an incoming call directed to a predetermined network address associated with said subscriber, said subscriber's PCS Agent service profile is accessed to enable said application processor module to route said incoming call according to a predetermined call treatment established by said subscriber.

39. A system as defined in claim 38, wherein said means for determining whether said request for service is associated with a subscriber of said PCS Agent service comprises a first database containing a list of said subscribers.

40. A system as defined in claim 39, wherein said means for determining whether said request for service originates from an authorized network address comprises said first database which is queried when said subscriber goes off-hook at a telephone having a network address identified in said first database.

41. A system as defined in claim 40, further comprising placing a predetermined application processor module on standby once said request for service is determined to be associated with an authorized network address.

42. A system as defined in claim 39, further comprising second database means for storing said subscriber's PCS Agent service profile.

43. A system as defined in claim 40, wherein a predetermined application processor module is activated according to whether DTMF or voice commands are initially received by said application processor.

44. A system as defined in claim 41, wherein a dial tone is sent to said subscriber telephone if no input isreceived from the subscriber within a predetermined time limit.

45. A system as defined in claim 43, wherein said predetermined application processor module comprises an audio response module which is activated if an indication is received at said application processor module that one or more messages have been stored for the subscriber.

46. A system as defined in claim 43, wherein said predetermine application processor module comprises a speech recognition module which is placed on standby when said subscriber goes off-hook in the event that the subscriber inputs a voice command to said application processor.

47. A system as defined in claim 43, wherein said predetermine application processor module comprises a DTMF detector module which is placed on standby when said subscriber goes off-hook in the event the subscriber inputs a DTMF signal to said application processor module.

48. A system as defined in claim 40, wherein said communication path is established between said authorized network address and said application processor when said subscriber goes off-hook at a telephone associated with an authorized network address.

49. A system as defined in claim 38, further comprising means for detecting whether an Initial Address Message (IAM) of an incoming call received at said telephone switching centre is indicative of an incoming call to a subscriber network address associated with said PCS agent service.

50. A system as defined in claim 49, wherein a query is sent to said second database means to determine a subscriber's incoming call treatment before establishing a communication path between a calling party and a network address associated with the subscriber receiving the call.

51. A system as defined in claim 38, wherein identity information of said service subscriber is forwarded to said application processor to enable it to access the subscriber's PCS Agent service profile.

52. A system as defined in claim 51, wherein said identity information comprises Calling Line Identifier (CLID).

53. A system as defined in claim 46, wherein said means for establishing a communication path further comprises:
 i) means for receiving said voice command at said speech recognition module if a voice command is input by the subscriber, and said speech recognition module being comprised of;
  means for translating said voice command to a speech signal;
  means for comparing said speech signal to signal representation of predetermined stored commands;
  means sending a code to a data processor indicative of the voice command input by said subscriber; and ii) means for activating a predetermined application processor module according to the recognized command action required by said predetermined application processor module.

54. A system as defined in claim 45, further comprising means for sending a message waiting indication to each telephone device identified in the subscriber's PCS agent service profile.

55. A system as defined in claim 50, wherein said application processor module comprises a voice messaging module connected to said telephone switching center for interfacing with said calling party if said query to said second database means is indicative of a voice message call treatment for the call associated with said IAM.

56. A system as defined in claim 50, wherein said call treatment comprises the activation of a call screening and prioritization service tailored to the subscriber's profile.

57. A system as defined in claim 53, wherein said speech recognition module is further comprised of:
means for receiving a predetermined voice command along with the name of the called party indicative that said subscriber requires voice activated dialing (VAD);
means for obtaining an appropriate command code associated with a VAD request from the speech recognition module;
means for obtaining an appropriate name code associated with the spoken name of the called party from the speech recognition module;
means for retrieving the called party's telephone number from said subscriber profile corresponding to said name code; and
DTMF generator means for dialling the called party's telephone number.

58. A system as defined in claim 40 wherein said request for service is determined to originate from an authorized network address when said subscriber enters an authorization code at a telephone having a network address which is not identified in said first database.

59. A system as defined in claim 58 wherein said means for determining comprises:
means for receiving said authorization code at said application processor providing said PCS service agent;
means for verifying said authorization code against a list of authorization codes associated with said subscribers; and
means for activating when required a predetermined application processor module to enable interaction between the calling subscriber and said PCS agent service.

60. A system as defined in claim 59, wherein said means for verifying further comprises means for requesting said subscriber to speak a voice print identification word to enable said application processor to verify the authenticity of the calling party.

61. A system as defined in claim 45, wherein said audio response module is activated in response to queries made by said subscriber via said PCS agent service.

62. A system as defined in claim 61, wherein said message waiting queries comprise at least one of the caller's name, the caller's telephone number, the time and date of the call.

63. A system as defined in claim 53, wherein said voice activated command comprises at least one of initiating a call using voice-activated dialing based on the called party's name, initiating a call using voice-activated dialing using the called party's number, initiating a private call wherein the subscriber's calling line identification is kept private, reviewing the subscriber's list of contacts, reviewing the subscriber's incoming callers log, checking for a specific call from said incoming callers log, setting the screening parameters for incoming calls, reviewing said screening parameters, initiating call-forwarding, reviewing greetings for voice messages and calls waiting features, requesting said PCS agent service to provide the name of a caller identified in said message waiting indication, setting up a conference call, activating and de-activating call screening and prioritizing features, reviewing and setting schedule parameters, accessing said subscriber's service profile, initiating a reminder for said subscriber, and accessing administrative features of the PCS agent services.

64. A system as defined in claim 42, wherein said subscriber's PCS agent service profile comprises at least one of the subscriber's preferred language settings for interfacing with said PCS agent service, said subscriber's name recording in said subscriber's own voice, a password for remote access authorization, a subscriber list of authorized telephone numbers from where said subscriber can interface directly with said PCS agent service, a subscriber password setting to identify security levels when said subscriber accesses said service profile and a class of service available to said subscriber at each of said network addresses authorized by said subscriber.

65. A system as defined in claim 64, wherein second database means containing said subscriber profile further comprises a contact database having at least one of a default schedule for automatically changing call forwarding locations to a predetermined network address selected by said subscriber, an override schedule activated by said subscriber to take precedent over said default schedule, and a day-of-the-week and time-of-day schedule to enable said subscriber's PCS agent to route incoming calls according to a call treatment defined by said subscriber in said schedule database.

66. A system as defined in claim 64 wherein said PCS subscriber service profile further comprises a contact database having at least one of a list of contact names in the subscriber's own voice, a list of contact names in the contact's own voice, a list of contact telephone numbers identifying the contact's work, home, cellular, fax and other telephone numbers identifying said contact, a list of contact categories defined according to said subscriber's requirement, a contact priority list identifying call screening and prioritization levels for each of said contacts, and a specific screening disposition entry identifying a unique call screening and prioritization level for one of the contacts on said list.

67. A system as defined in claim 65, wherein a network address identified in said schedule database where said subscriber can be reached is automatically updated according to which network address said PCS subscriber is initiating a request for service from.

68. A system as defined in claim 65, wherein selective call forwarding can be requested by said PCS agent subscriber by instructing said PCS agent while said subscriber is reviewing said subscriber schedule database to activate call screening and allow calls from a predetermined contact identified in a subscriber's contact database.

69. A system as defined in claim 49, wherein a call waiting option is provided by said PCS agent if another incoming call is received at said telephone switching centre with an initial address message indicative of an incoming call to any one of said subscriber network addresses associated with said PCS agent service.

70. A system as defined in claim 69, wherein said Personal Agent further screens said other incoming call according to said subscriber's service profile.

71. A system as defined in claim 44, wherein said PCS subscriber can request access to said voice messaging system by a voice-activated command directing the Personal Agent to activate a voice messaging system module in accordance with said PCS subscriber's service profile.

72. A system as defined in claim 70, wherein access to said voice messaging system module is provided to said PCS subscriber using voice-activated commands directing the subscriber to at least one of stored messages, message greetings, and call return feature based on any one of the stored messages.

* * * * *